United States Patent
Jafri

(10) Patent No.: US 10,922,709 B2
(45) Date of Patent: Feb. 16, 2021

(54) MERCHANDISING PLATFORM FOR AIRLINE INDUSTRIES

(71) Applicant: OnVoya, Inc., Redwood Shores, CA (US)

(72) Inventor: Vajid Jafri, Redwood Shores, CA (US)

(73) Assignee: Onriva LLC, Foster City, CA (US)

( * ) Notice: Subject to any disclaimer, the term of this patent is extended or adjusted under 35 U.S.C. 154(b) by 223 days.

(21) Appl. No.: 15/867,025

(22) Filed: Jan. 10, 2018

(65) Prior Publication Data

US 2018/0204237 A1    Jul. 19, 2018

Related U.S. Application Data

(60) Provisional application No. 62/446,215, filed on Jan. 13, 2017.

(51) Int. Cl.
*G06Q 30/02* (2012.01)
*G06Q 50/14* (2012.01)
*G06Q 10/02* (2012.01)

(52) U.S. Cl.
CPC ......... *G06Q 30/0222* (2013.01); *G06Q 10/02* (2013.01); *G06Q 10/025* (2013.01); *G06Q 30/0233* (2013.01); *G06Q 50/14* (2013.01)

(58) Field of Classification Search
CPC .... G06Q 30/022; G06Q 10/025; G06Q 50/14; G06Q 30/0233
See application file for complete search history.

(56) References Cited

U.S. PATENT DOCUMENTS

| | | | | |
|---|---|---|---|---|
| 6,839,679 | B1 * | 1/2005 | Lynch | G06Q 30/06 705/5 |
| 8,005,685 | B1 * | 8/2011 | Bird | G06Q 30/06 705/1.1 |
| 2008/0249895 | A1 * | 10/2008 | Mariotti | G06Q 10/02 705/5 |
| 2013/0024404 | A1 | 1/2013 | Zacharia et al. | |
| 2013/0073323 | A1 | 3/2013 | Zacharia et al. | |
| 2015/0332176 | A1 * | 11/2015 | Shaw | G06Q 10/02 705/5 |
| 2016/0378874 | A1 * | 12/2016 | Jafri | H04L 67/02 707/706 |
| 2017/0004590 | A1 | 1/2017 | Gluhovsky et al. | |
| 2017/0046732 | A1 * | 2/2017 | Elmachtoub | G06Q 30/0243 |
| 2017/0154353 | A1 * | 6/2017 | Ralston | G06Q 30/0226 |
| 2018/0032581 | A1 * | 2/2018 | Baldeschi | G06F 16/2457 |

OTHER PUBLICATIONS

Nigel Jones, A tutorial on lookup tables in C, Jan. 11, 2010, p. 1. https://embeddedgurus.com/stack-overflow/2010/01/a-tutorial-on-lookup-tables-in-c/.*

(Continued)

*Primary Examiner* — Kevin H Flynn
*Assistant Examiner* — Jesse L Silvernail
(74) *Attorney, Agent, or Firm* — Fenwick & West LLP

(57) ABSTRACT

Discounted ticket prices for flight itineraries are obtained by purchasing merchandises offered by the airlines or by the airline partners. For example, duty free merchandises, souvenirs or specialty items are purchased together with the flight tickets to lower the prices of the flight itineraries.

18 Claims, 15 Drawing Sheets

| Airline name | Depart time | Arrival time | ... | Total value | Total cost |
|---|---|---|---|---|---|
| United | 8:00AM | 6:00PM | ... | $1100 | $850 |
| Delta | 10:00AM | 8:00PM | ... | $1000 | $800 |
| American | 2:00PM | 12:00PM | ... | $750 | $750 |

(56) References Cited

OTHER PUBLICATIONS

IATA, Business Requirements Document NDC 1: Airline Shopping, Oct. 23, 2013, pp. 4, 7, 12, 19-10, 40-42. https://web.archive.org/web/20140716022609/http://www.iata.org/whatwedo/airline-distribution/ndc/Docunnents/ndc-shopping-brdv179-release.pdf.*
Southwest Airlines, EarlyBird Check-In, accessed via Wayback Machine on Feb. 24, 2013, p. 1. https://web.archive.org/web/20130224191700/http://www.southwest.com/html/generated/help/faqs/earlybird_checkin_faq.html.*
De Santis, G., "Which Future for the Airline Distribution?" LUISS, Sep. 30, 2013, 100 pages.
WNS, "New Distribution Capability for Airlines: Preparing for Take-off," WNS Holdings, Jun. 2, 2015, 4 pages.

* cited by examiner

| Airline name | Depart time | Arrival time | ... | Fare | Detail | Compare |
|---|---|---|---|---|---|---|
| United | 8:00AM | 6:00PM | ... | $800 | Detail | Compare |
| Delta | 10:00AM | 8:00PM | ... | $805 | Detail | Compare |
| American | 2:00PM | 12:00PM | ... | $805 | Detail | Compare |

*FIG. 1A*

|  | United |
|---|---|
| Fare | $800 |
| Seat size | 17/31 |
| Screen | Overhead |
| Luggage | 100lbs |

*FIG. 1B*

|  | United | Delta | American |
|---|---|---|---|
| Fare | $800 | $805 | $805 |
| Seat size | 18/31 | 18/35 | 18/32 |
| Screen | Overhead | Personal | Personal |
| Luggage | 100lbs | 80lbs | 50lbs |

*FIG. 1C*

Showing a value of a flight itinerary, wherein the value comprises fare and characteristics of the flight
200

FIG. 2A

Comparing values of multiple flight itineraries, wherein the values comprise fares and characteristics of the flights
220

FIG. 2B

Searching for a flight itinerary
240

Displaying search results, showing flight schedules meeting the search criteria
250

Displaying characteristics of the flight schedules or pathways to obtain the characteristics
260

Displaying a comparison of characteristics of the flight schedules or pathways to obtain the comparison
270

FIG. 2C

| Airline name | Depart time | Arrival time | ... | Fare | Detail | Compare |
|---|---|---|---|---|---|---|
| Delta | 10:00AM | 8:00PM | ... | $805 | Detail | Compare |
| United | 8:00AM | 6:00PM | ... | $800 | Detail | Compare |
| American | 2:00PM | 12:00PM | ... | $805 | Detail | Compare |

|  | Ranking |
|---|---|
| Fare | 10 |
| Seat | 9 |
| Entertainment | 8 |
| Food | 7 |

FIG. 3B

|  | Ranking |
|---|---|
| Fare | 10 |
| Power | 9 |
| wifi | 9 |
| Seat | 8 |

FIG. 3C

| Airline name | Depart time | Arrival time | ... | Total value | Total cost |
|---|---|---|---|---|---|
| United | 8:00AM | 6:00PM | ... | $1100 | $850 |
| Delta | 10:00AM | 8:00PM | ... | $1000 | $800 |
| American | 2:00PM | 12:00PM | ... | $750 | $750 |

*FIG. 5A*

| | |
|---|---|
| Fare | $850 |
| Wifi | $50 |
| Early boarding | $50 |
| Additional luggage | $50 |
| Bonus frequent flyer | $50 |
| Lounge access | $50 |
| Total Value | $1100 |

*FIG. 5B*

| Airline name | Depart time | Arrival time | ... | Total value | Total cost |
|---|---|---|---|---|---|
| United | 8:00AM | 6:00PM | ... | $1100 | $850 |
| Delta | 10:00AM | 8:00PM | ... | $1000 | $800 |
| American | 2:00PM | 12:00PM | ... | $750 | $750 |

Showing a total value and a total cost of a flight itinerary, wherein the total value comprises fare and bonus offerings for the flight
600

FIG. 6A

Comparing total values of multiple flight itineraries, wherein the total values comprise fares and bonus offerings of the flights
620

FIG. 6B

Searching for a flight itinerary
640

Displaying search results, showing flight schedules meeting the search criteria
650

Displaying bonus offerings of the flight schedules or pathways to obtain the bonus offerings
660

Recommending one or more flight schedules of the search results based on a profile of the customer with respect to the bonus offerings
670

FIG. 6C

Offering bonus offerings to a flight schedule based on seasonal conditions
700

FIG. 7A

Selecting bonus offerings based on a profile of a customer
720

FIG. 7B

Presenting a list of bonus offerings for a customer to choose from
740

FIG. 7C

Displaying flight schedules meeting a search criteria
760

Displaying bonus offerings of the flight schedules or pathways to obtain the bonus offerings based on seasonal conditions or based on a customer profile
770

Displaying a list of bonus offerings or a pathway to obtain the list for a customer selection
780

FIG. 7D

| Airline name | Depart time | Arrival time | ... | Fare | Bonus saving | Additional saving |
|---|---|---|---|---|---|---|
| United | 8:00AM | 6:00PM | ... | $800 | $100 | $75 |
| Delta | 10:00AM | 8:00PM | ... | $805 | $50 | $100 |
| American | 2:00PM | 12:00PM | ... | $805 | $0 | $50 |

*FIG. 9A*

| | |
|---|---|
| Wifi | $50 |
| Lounge access | $50 |
| Total Bonus Saving | $100 |

*FIG. 9B*

| | Regular price | Offered price | Saving |
|---|---|---|---|
| Early boarding | $50 | $25 | $25 |
| Additional luggage | $100 | $75 | $25 |
| Bonus frequent flyer | $50 | $25 | $25 |
| Total Additional Saving | | | $75 |

*FIG. 9C*

| Airline name | Depart time | Arrival time | . . . | Total cost | Detail | Offer |
|---|---|---|---|---|---|---|
| United | 8:00AM | 6:00PM | . . . | $800 | Detail | Offer |
| Delta | 10:00AM | 8:00PM | . . . | $805 | Detail | Offer |
| American | 2:00PM | 12:00PM | . . . | $805 | Detail | Offer |

FIG. 10A

|  | Regular price | Offered price | Saving | Select |
|---|---|---|---|---|
| Wifi | $50 | $0 | $50 | X |
| Lounge access | $50 | $0 | $50 | X |
| Early boarding | $50 | $25 | $25 | ☐ |
| Additional luggage | $100 | $50 | $50 | ☐ |
| Bonus frequent flyer | $50 | $50 | $0 | ☐ |
| Seat upgrade | $50 | $50 | $0 | ☐ |
| Business class upgrade | $200 | $200 | $0 | ☐ |
| Total Additional Saving |  |  | $100 |  |

FIG. 10B

Showing flight information together with merchandising information to a customer
1100

FIG. 11A

Embedding merchandising information to a flight schedule to show to a customer
1120

FIG. 11B

Searching for a flight itinerary
1140

↓

Displaying search results, showing flight schedules meeting the search criteria
1150

↓

Displaying merchandising information in the flight schedules or pathways to obtain the merchandises
11110

↓

Recommending one or more flight schedules of the search results based on a profile of the customer with respect to the merchandising information
1170

FIG. 11C

Managing frequent flyer points to maximize a frequent flyer value for a customer
1300

Suggesting or performing actions related to frequent flyer programs to a customer
13130

Receiving a request from a customer for a flight itinerary
1340

Suggesting at least a favorable flight schedule, wherein the flight schedule is favorable due to a frequent flyer element
1350

Accessing a frequent flyer program of a customer
1490

Downloading data in the frequent flyer program to a local database
1491

MERCHANDISING PLATFORM FOR AIRLINE INDUSTRIES

CROSS REFERENCE TO RELATED APPLICATIONS

This application claims the benefit of U.S. Provisional Application No. 62/446,215, filed Jan. 13, 2017, which is incorporated by reference in its entirety.

BACKGROUND

Airline reservation systems include a computerized system for storing and retrieving information and for conducting transactions related to air travel. With the advances of internet network, the airline reservation systems have been tailored to meet the customer demands, in which a customer can make reservation, purchase ticket, plan traveling trips, together with selecting other features such as upgrading, more leg room, redeeming frequent flyer miles, rebooking canceled flight, selecting seats, purchasing day club passes, priority boarding, and others.

There can be hundreds of flight itineraries in a search for a travel plan, which can make difficult the selection of a suitable flight itinerary. For example, there can be trade-offs between cost and comfort, such as lower price for longer layover time, or the unavailability of certain amenities such as early boarding or Wi-Fi connectivity.

Thus there is a need for provide incentive for the user for finding optimal airline itineraries.

SUMMARY

In some embodiments, the present invention discloses methods, and merchandising platform implementing the methods, to provide incentives to users looking to purchase flight tickets. Discounts can be provided to the users when the users purchase qualified merchandises offered by the airlines or by partners of the airlines.

In some embodiments, the present invention discloses a platform, e.g., a program running on a data processing system, which can be configured to offer merchandises to customers looking for travel, such as for air travel. The merchandising platform can receive communication from customers, such as requests for flight itineraries between cities, and then communicate with airlines, directly to the airlines or indirectly through an airline network such as GDS, to obtain flight information, together with merchandising information. Alternatively, the merchandising platform can already receive merchandising information from airlines. Thus when the merchandising platform receives inquiries from customers, the merchandising platform can attach the merchandise information to the flight information. The merchandising platform then can convey the flight and merchandise information to the customers. In addition, the merchandising platform can also facilitate two way communication between the customers and the airlines, for example, to discuss or negotiate terms for the merchandises.

In some embodiments, the present invention discloses methods to compare flight itineraries using values, instead of ticketed prices. The values of a flight itinerary can include flight characteristics, discounts and bonus offered by the airlines that are interested by the user.

BRIEF DESCRIPTION OF THE DRAWINGS

FIGS. 1A-1C illustrate configurations for flight values according to some embodiments.

FIGS. 2A-2C illustrate flow charts for a merchandising platform to display values of flights according to some embodiments.

FIGS. 3A-3C illustrate configurations for customer preferences according to some embodiments.

FIGS. 5A-5C illustrate configurations for flight values according to some embodiments.

FIGS. 6A-6C illustrate flow charts for a merchandising platform to display values of flights according to some embodiments.

FIGS. 7A-7D illustrate flow charts for merchandising configurations according to some embodiments.

FIGS. 9A-9C illustrate configurations for flight values according to some embodiments.

FIGS. 10A-10B illustrate configurations for merchandising platform displays according to some embodiments.

FIGS. 11A-11C illustrate flow charts for a platform to display merchandising information in searched flights according to some embodiments.

Figure 4A:
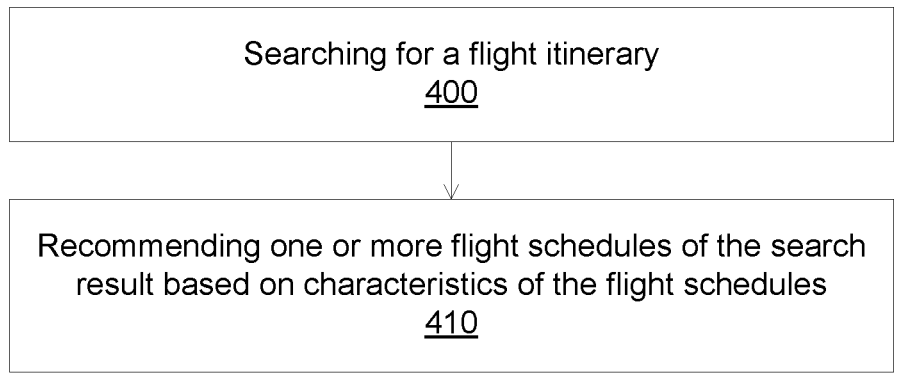
FIGS. 4A-4C illustrate flow charts for processes of recommending flights to a customer according to some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In some embodiments, the present invention discloses a merchandising platform for airline industries, such as a program running on a data processing system for offering merchandising information from the airlines. The merchandising platform can offer merchandises having discounts applicable to the airfares. The merchandising platform can show values of the flight schedules that are offered by the airlines, in addition to the cost of purchasing the flights. The values of the flights can include detail characteristics of the flights, which can include the flight comfort and service, such as seat width, pitch, and legroom, personal or overhead entertainment, availability of power ports on seats, and number and weight of checked baggage. The values of the flights can include advantages and benefits, for example, over the competition, which can include promotion and bonus offerings from the airlines, such as free wifi, early boarding, free lounge access, additional luggage, and bonus frequent flyer points. The airlines can introduce a new service, and can use the merchandising platform to test the marketability of the new service.

In some embodiments, the merchandise platform can offer discounts to the ticket prices of the flight itineraries through the purchasing of merchandises offered by the airlines or by the airline partners. For example, duty free merchandises, souvenirs or specialty items can be purchased together with the flight tickets to lower the prices of the flight itineraries.

In some embodiments, the merchandise platform can interact with a user, for example, by accepting a travel request from the user, which can include a departure location, an arrival location, and a time and date of travel. Multiple flight itineraries can be found matching the user travel requirements, which can be presented to the user.

The merchandise platform can also present merchandise information to the user, for example, by provide links to the merchandises together with the flight itineraries. Alternatively, the merchandise platform can present merchandise information to the user after the user select a flight itinerary. The merchandises can be associated with the merchandise platform, in partnership with the airlines offering the flight itineraries. The merchandises can be directly associated with the airlines offering the flight itineraries.

In some embodiments, the present invention discloses methods, and merchandise platform for performing the methods, that can provide discount prices of flight itineraries when users purchase merchandises linked to airlines offering the flight itineraries. The discount can be offered to the user in the form of frequent flyer points awarded to the user. The discount can be offered to the user in the form of cash discount, e.g., a reduction in the ticket prices of the flight itineraries. The merchandises can include duty-free merchandises, souvenirs or specialty items at a destination of the flight itinerary, luxury merchandises, promotional merchandises, or any other types of merchandises.

In some embodiments, the user can select a flight itinerary among the flight itineraries that are presented to the user during a search for a trip. The price of the flight itinerary can also be presented to the user. In some embodiments, a merchandise platform can offer merchandises to the user if the user chooses to browse the merchandise offering. For example, a link to the merchandises can be presented to the user in a vicinity of the flight itinerary. Upon selecting the link, a separate view can be open, showing the merchandises that can be purchased.

Alternatively, the links to the merchandises can be presented together with the flight itineraries, e.g., different links can be shown for different flight itineraries. Thus, instead of selecting the flight itinerary before selecting the merchandise link, the user can select the merchandise link associated with the flight itinerary, which in effect, indirectly selecting the flight itinerary that is associated with the merchandise link.

The merchandises can be associated with the airlines, e.g., the airlines can have a business selling the merchandises. The merchandises can be associated with partners of the airlines, e.g., companies that work with the airlines to share the profit of selling the merchandises. The merchandises can be associated with the merchandise platform, e.g., the merchandise platform can provide a medium in which the airlines and the merchandise companies can work together to promote both companies.

The merchandise platform can offer multiple merchandises to the user. The offered merchandises can include discounts applicable toward the price. The discounts can be in the form of a perk to the user, such as frequent flyer points, upgradable flight characteristics, or other amenities of the airlines. The discounts can be in the form of cash discount, which can reduce the ticket prices of the flight itineraries. The discounts can be both, such as a portion of the discounts can be a cash discount, and another portion can be a perk discount.

After purchasing the offered merchandises, the user can be credited with the discounts from the airlines. To assist the user in selecting the merchandises, the merchandise platform can show a review of the merchandises selected by the user, together with the total cash discount toward the price of the flight itinerary, and/or the perk discount for the user in the selected slight itineraries. The merchandise platform can show the reduced price of the flight itinerary. The discount can be applied to the user, e.g., applied to the price of the ticket, or offered to the user as a perk, after the user completes the purchase. In some embodiments, the merchandises can be purchased with frequent flyer points of the user. In some embodiments, the merchandise platform can show a saving value for the flight itinerary as a result of purchasing the merchandise.

In some embodiments, the purchased merchandises can be delivered to a destination chosen by the user, such as the user home address, or to another address as a gift. The merchandises can be delivered to the airport, for example, to be handed to the user in person at the airport or in the airplane, or as a cargo in the airplane for the user to pick up at the baggage claim. A baggage claim can be provided to the user at the airport to allow the user to receive the purchased merchandise at a baggage claim of the airline.

In some embodiments, the merchandises can include duty-free merchandises. The duty free merchandises can be picked up by the user at the arrival airport, in cases the user travels from the home country to a foreign country. The duty free merchandises can be delivered to the user at the departure airport, in cases the user returns from the foreign country to the home country. Alternatively, the duty free merchandises can be shipped as flight cargo from the foreign departure airport, for the user to pick up at the home arrival baggage claim.

In some embodiments, the merchandises can include souvenirs or specialty items at a destination of the flight itinerary. The merchandises can be picked up at the arrival destination airport on the going forward segment of the flight itinerary, or can be picked up at the arrival home airport on the return segment. The merchandises can include souvenirs or specialty items at the departure airport, e.g., the home town of the user, to be pickup at the departure airport or at the arrival airport either in a store or at the baggage claim. The merchandises can be used as gifts from the user to the persons at the arrival destination.

In some embodiments, the merchandises can include luxury merchandises, such as watches, hand bags, or perfume. The merchandises can include other types of merchandises, which can be used to increase the value of the flight itineraries.

Values, instead of the ticket price, of the flights can be used to compare flight itineraries offered by different airlines. For example, flight characteristics, such as seat information, entertainment programs, food menu, and safety record can be counted in the determination of the values of a flight itinerary. In addition, offers, discounts, and bonuses can also be counted. The conversion of the flight characteristics, offers, discounts, and bonuses into monetary value can be based on a profile of the user.

The merchandising platform can also show offerings from the airlines, such as services and/or offers that the customers might be interested in. For example, the merchandising platform can show the cost to upgrade to business class, or the cost to purchase wifi or movies. Costs for other services can be included, such as curb side check in, early boarding, lounge access, and additional luggage. The merchandising platform can show the features that the customers prefer, for example, from profiles of the customers. Special offerings can be included, such as offers that can be redeemed by frequent flyer points. The display of the flight values and offers can allow a customer to select flights with the most comfort for enjoying the travel trip and not over-tired from the transit.

In some embodiments, the values of a flight schedule can include the characteristics of the flight, which can include the physical details of the flight airplanes and the services of the flight crew. For example, the seat information can be provided, such as a pitch between adjacent seats, a width of the seat, and a pitch between front and back seats. The seat information can indicate a seating comfort, with large seat pitches and width offering more elbow and leg rooms.

The entertainment information can be provided, including hardware of overhead screen, e.g., a shared screen for a large portion of the airplane, personal screen, e.g., individual screens for each passenger, or no screen at all. Information about entertainment programs can be included, such as free movies or pay per view.

The luggage information can be provided, such as the number and weights of carry-on luggage, and the number and weights of checked luggage. The service information can be provided, such as snack only, or lunch or dinner meals, together with details of the food service. Other information can be provided, such as seat availability, such as available window or aisle seats, online seat selection or online check in. For example, a customer might not be able to check in online for a codeshared flight segment, since the original airline, e.g., the airline that offers the ticket, does not have information on the codeshared airline, and the codeshared airline, e.g., the airline that is a partner of the original airline and is sharing a service route, does not recognize the customer since the ticket is not issued by the codeshared airline. Since this information is generally not readily available, the inclusion of this information to the values of the flight can assist the customer in determining the best suitable selection.

In some embodiments, the characteristics of different flights can assist the customer in selecting a suitable flight. For example, a search for a flight from Chicago to New York can result in multiple flight schedules, with some of the flight schedules having similar or identical fares. With the display of the flight values, e.g., the characteristics of different flights, a customer can easily select a flight schedule that is most suitable. For example, a person with long legs can select a flight with high leg room seats. A heavy set person can select a flight with wider seats. Personal screens can be highly desirable, over overhead screens, for long flights. Good food service, e.g., multiple choice food menu, can be desirable over no food service or poor food service or pay-for-food service.

In some embodiments, the characteristics of different flights can be shown together, for example, side-by-side, for a direct comparison. The side-by-side direct comparison can allow the customer to quickly notice the differences in the different flight schedules, which can allow the customer to make decision regarding the most suitable flight schedule to purchase. Different flight schedules can be different advantages and benefits, thus the selection of suitable flight schedules can be based on personal preferences, e.g., different customers can select different flight schedules based on different characteristics.

FIGS. 1A-1C illustrate configurations for flight values according to some embodiments. FIG. 1A shows a portion of a display for flights resulted from a search for a flight itinerary. For example, a customer can send a travel request to a platform. The travel request can include a departure location, an arrival location, and a date of travel. The platform can search for available flights meeting the customer specifications. The platform then can show the searched flights, which can be sorted based on a customer preference, such as ordered by price. There can be multiple flights, of which three flights are shown. Information about the flights can be shown, such as the airline name, the departure time, the arrival time, and the airfare. Other information can be included, such as the name of the departure and arrival airports.

Other details of the flights can be shown, such as details of the flight characteristics, including the physical specifications of the airplane and the services of the flight crew. A pointer, such as icons "Detail", can be used, instead of the listing of the flight details. Thus when the icon is pressed, another window can be open, showing the details of the flight characteristics.

In addition, there can be a comparison between flights. A pointer, such as icons "Compare", can be used, instead of the actual comparison. Thus when the icon is pressed, another window can be open, showing a comparison of different flights. There can be other selections, such as a box to mark for the flights that the customer wishes to see a comparison.

The figure shows a specific example of an output of a merchandising platform, to show the flight schedules, flight fares, detailed characteristics of the flights, and comparisons between different flights. As shown, the detailed characteristics are represented by a pathway, such as an icon linking to the detailed characteristics. Other configurations to show the detailed characteristics can be used, such as listing the detailed characteristics along with the schedules and fares, such as allowing the customer to roll the screen to see other values.

FIG. 1B shows a portion of a list of characteristics for a flight. For example, the customer can select a United flight to show the detailed characteristics, e.g., pressing on the Detail icon in the United flight display. A new screen can be shown, listing the characteristics of the United flights, such as the fare, the seat size (e.g., seat width and adjacent seat pitch), whether the entertainment screen is overhead or personal, and the weight of the allowable checked luggage. Other characteristics can be shown, such as the pitch of the front and back seats, e.g., characterized the amount of leg room for the seat, is there a power port at seat and type of power port, is there wifi, free or for purchase, is there a free lounge access, is there a free or upgradable early check in, what is the food, drink, and snack menu, the airline review, such as safety and service records of the airline. The detailed characteristics can be obtained from the airlines, for example, due to a rich content information exchange such as by airline API, airline websites, or by airline adaptation of NDC standards for third party access.

FIG. 1C shows a portion of a comparison of characteristics for different flights. For example, a customer can select three flights for comparison. The flight information, e.g., the detailed characteristics can be shown in a side-by-side listing. Other information can also be shown, such as the departure and arrival time.

FIGS. 2A-2C illustrate flow charts for a merchandising platform to display values of flights according to some embodiments. In FIG. 2A, operation 200 shows a value of a flight itinerary, wherein the value comprises fare and characteristics of the flight. For example, a platform, such as a merchandising platform, can be configured to show characteristics of flights between locations. The characteristics can include details of the flights, such as physical specification of the airplane, to show the customer the comfort that the flights can offer, the entertainment and the service on the flights. The details of the flights can allow a customer to know about the different flights, and can select a flight that best suites his preferences.

In FIG. 2B, operation 220 compares values of multiple flight itineraries, wherein the values comprise fares and characteristics of the flights. For example, a platform, such as a merchandising platform, can be configured to show characteristics of different flights. The comparison can allow a customer to quickly access the differences between flights, to select a flight that best suites his preferences.

In FIG. 2C, operation 240 searches for a flight itinerary. A customer can contact a platform, such as a merchandising platform, for a travel itinerary. The platform can search for flights meeting the customer request, e.g., satisfying the travel itinerary requirements. The platform can contact the airlines, using NDC standards or airline API, or through the airline websites. The platform can also communicate with GDS network.

Operation 250 displays results of the search, showing flight schedules meeting the search criteria. The display can be sorted, according to a default or a customer preference, such as sorted by price. The display can also include basic flight information, such as flight fares, departure time, arrival time, departure airport, arrival airport, layover time, and total travel time.

Operation 260 displays characteristics of the flight schedules or pathways to obtain the characteristics. The characteristics of the flights can include the physical specification of the airplane that the customer might be interested in, such as information related to the seat (the width of the seat, the pitch between two adjacent seats, the leg room of the seat), information related to the display screen (personal display at every seat, overhead display for a section of the airplane, or no display at all), information related to power ports (is there a power port at the seat, types of power port such as usb power port or household power port). The characteristics of the flights can include the services on the airplane, such as information about the entertainment program (on demand program or predetermined program, free movies or pay per view movies), information about food service (dinner, lunch, or snack, or pay per meal), information about checked baggage (weight or number of pieces of luggage), information about wifi connectivity. Other information can be included, such as upgradable services and frequent flyer program availability.

The characteristics of the flights can be shown together with the basic flight information, for example, in a large array format. The customer can roll the screen horizontally to obtain the information. Alternatively, a pathway can be included for each flight, and a selection of the pathway can bring the customer the details of the flight characteristics. For example, an icon can be shown for each displayed flight, and a customer can click on the icon to obtain the detail information.

Operation 270 displays a comparison of characteristics of the flight schedules or pathways to obtain the comparison. The customer can select a number of flights for comparing the characteristics. Using a direct comparison, the difference in flight enjoyment and comfort can be seen at a glance, allowing the customer to make informed decision regarding which flight is best suited.

In some embodiments, one or flight schedules can be recommended, for example, by the merchandising platform that presents the values of the different flight schedules. If the values are markedly different, a flight schedule can stand out among the different possible flight schedules, based on the best offered values. For example, if there are three different flight schedules with similar fares, but only one flight schedule offers wider seats with longer leg rooms, together with personal screen entertainment and food menu selection, the flight schedule can be recommended over the other flight schedules.

The recommendation can be generic, such as based on the preferences of an average customer. For example, an average customer would prefer larger seats and personal screen with on-demand entertainment, with the seat comfort ranked higher than the entertainment service.

The recommendation can be based on a profile of the customer. The profile can specify the customer preferences, such as a high tech customer can prefer having a power port at seat, in order to powering a laptop, especially for long flight. A young customer can prefer a personal screen with on-demand entertainment. A large customer can have higher preference for wider seat than a skinny customer. The profile can be completed by the customer, such as by filling in a form or by answering questions. The profile can be completed by the platform, for example, based on the actions of the customer. For example, a customer can select an aisle seat in a flight schedule, and this selection can be recorded by the platform FIGS. 3A-3C illustrate configurations for customer preferences according to some embodiments. FIG. 3A shows a portion of a display for flights resulted from a search for a flight itinerary together with a recommendation 310, for example, from the platform based on a profile, either from a customer profile if the customer has one, or from a generic profile if the customer does not have a stored profile. The recommendation flights, e.g., one or more flights can be recommended, can be arranged at a top of the searched display, and can be highlighted.

FIG. 3B shows a generic profile, such as a profile for an average customer. The profile can a list of items, such as the characteristics of the flights, like fare, seat information, entertainment information, food information, and other information such as wifi, power port, etc. The items can each have a ranking, which shows the importance of the items. For example, the ranking can have a value from 0 to 10, with 0 implying that the item is not relevant, e.g., the flight is fine without the item, and with 10 implying the item is of the most important, e.g., it would be the first item the customer would be interested in the flight.

A genetic profile would have fare as the most important item, e.g., having a ranking of 10. Second important item would be comfort, which can be characterized by seat information and/or personal display screen, and which can have a ranking of 9. Third important item would be entertainment program, which can be characterized by ob-demand program, and which can have a ranking of 8. Fourth important item would be food service, which can be characterized by free food or to-be-purchased food, and which can have a ranking of 7. Other items can be ranked, such as checked baggage or power at seat. The difference in ranking can also related to a value, to allow a selection of flights based on the profile. For example, fare ranking could be rated at $20 per rank. Thus for a price difference of less than $20, the priority of fare is the same as the seat information, since there is only a ranking difference of 1 between these two items.

FIG. 3C shows an example of a profile of a customer. The customer profile could have fare as the most important item, e.g., having a ranking of 10. Second important item would be work related environment, which can be characterized as power at seat and wifi availability, and which can have a ranking of 9. Third important item could be comfort, which can be characterized by seat information and/or personal display screen, and which can have a ranking of 8. Other items can be ranked, such as checked baggage or entertainment or food. The difference in ranking can also related to a value, to allow a selection of flights based on the profile.

Figure 4B:
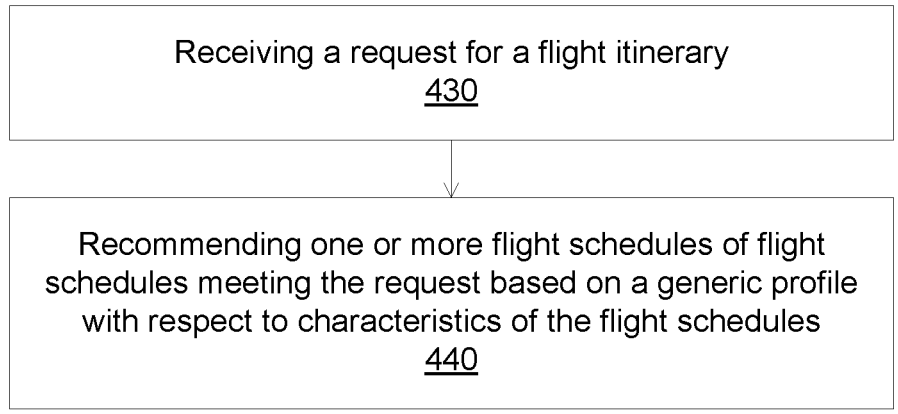
Figure 4C:
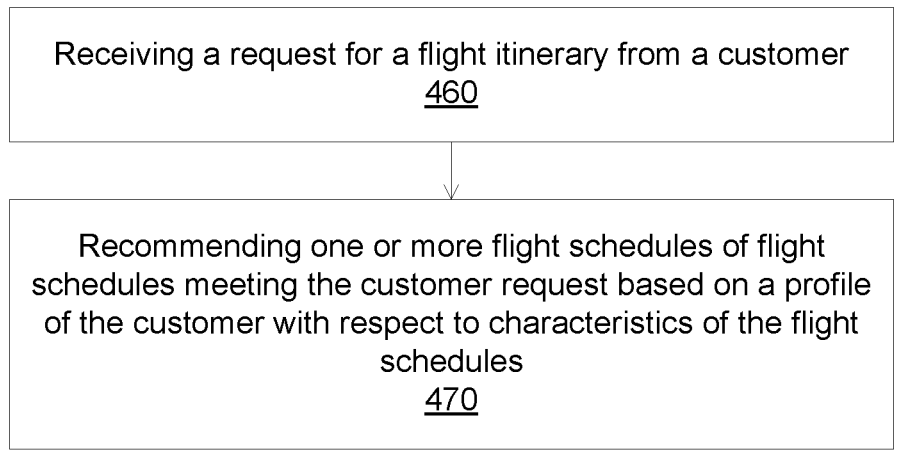

FIGS. 4A-4C illustrate flow charts for processes of recommending flights to a customer according to some embodiments. In FIG. 4A, operation 400 searches for a flight itinerary. A platform can perform the search after being contacted by a customer with his travel plan. The platform can search for basic flight information, e.g., departure time, arrival time, and fare. The platform can also search for flight characteristics, such as seat information, power information, entertainment information, and food information.

Operation 410 recommends one or more flight schedules of the search result based on characteristics of the flight schedules. The recommendation can be based on a generic profile or a specific profile of a customer.

In FIG. 4B, operation 430 receives a request for a flight itinerary. The request can be from a generic customer, sending to a platform. The platform then can search for available flights meeting the customer request, together with detailed information regarding the flights.

Operation 440 recommends one or more flight schedules of flight schedules meeting the request based on a generic profile with respect to characteristics of the flight schedules.

In FIG. 4C, operation 460 receives a request for a flight itinerary from a customer. The request can be from a customer having a stored profile with a platform. The platform then can search for available flights meeting the customer request, together with detailed information regarding the flights.

Operation 470 recommends one or more flight schedules of flight schedules meeting the customer request based on a profile of the customer with respect to characteristics of the flight schedules.

In some embodiments, the profile can be updated based on the action of the customer. For example, the platform can recommend multiple flights, each can be slightly different based on different interpretations of the profile. If the customer selects one of the recommended flights, the profile can be updated to reflect the selection, e.g., meaning the interpretation of the profile based on the selected flights is better suitable to the customer.

In some embodiments, the present invention discloses a platform, e.g., a merchandising platform, for providing values of flight schedules. The platform can accept requests from customers for travel needs, and then provide the customers with flight schedules meeting the customer requirements, together with detailed characteristics of the flight schedules. The platform can also suggest or make recommendation for one or more flight schedules, based on a common sense approach, e.g., based on the preferences of an average customer, or based on a profile of the customers.

In some embodiments, the platform can communicate with the airlines to obtain the detailed characteristics of the flights, in addition to the airfares. For example, the detail characteristics of the flights can be obtained by a rich content communication with the airlines, such as by a New Distribution Capability (NDC) program, which can allow the platform to access to full and rich air content to provide a transparent shopping experience. The detailed characteristics of the flights can be sent, from the airlines, to the platform, as a pre-package, e.g., to be stored in the platform storage server before the customer requests. Alternatively, the detailed characteristics of the flights can be sent when the customer asks, e.g., at the same time as the flight schedule and fare.

In some embodiments, the timing can be optimized, so that the customer does not have to wait too long for the flight results. For example, a quick search can be performed, to obtain the basic flight information. The top flights can also be searched for detailed characteristics, to be shown to the customer. Afterward, other flights can be searched for detailed characteristics. This can allow the customer to see the results quickly, instead of waiting for all flights to be searched before viewing.

In some embodiments, the values of a flight schedule can include the characteristics of the trip, which can include the bonus offerings from the airline. For example, the airlines can offer free wifi, early check in, additional luggage, airport lounge access, and bonus frequent flyer points. The total costs of the flights are the same, but the total values of the flights can increase significantly, due to the added free offerings from the airlines. The merchandising platform can present the total values and total costs of the flights, which can serve to show the customers about the benefits of taking the flights, and the advantages of the flights over those of the competitions.

In some embodiments, the airlines can offer bonus offerings for promotion purposes. For example, in low traveling season, the bonus offerings can entice the customers to select the flights. The bonus offerings can be used to introduce a new service of the airlines, such as wifi during the flights, a three for two program in which buying two tickets can get the customer a free third ticket, or longer leg room seats, e.g., seating in an economy plus class, in which the front and back seats are spaced further apart than seating in an economy class. The bonus offerings can serve to validate new services, for example, to see how the customers respond to the ideas.

The bonus offerings can increase a customer loyalty, similar to a frequent flyer program. For example, a customer can sign up with an airline for a bonus offering program, and the airline can offer bonus offerings when the customer selects a flight with the airline. The values of the bonus offerings can change, for example, depending on the flying season. For example, in high traveling seasons, there can be minimum bonus offerings, and in low traveling seasons, there can be more bonus offerings.

In some embodiments, the present invention discloses a bonus offering program, in which customers can sign up to receive bonus or discount offerings. Services and offers can be provided by the airlines to sign up customers, providing the customers with free or with lower costs than regular prices. The bonus and discount offerings can be presented by the merchandising platform, which can show the values of the flights, including bonus and discount offerings, together with other characteristics of the trips.

The bonus offerings can be based on a customer profile, e.g., the bonus offerings can be tailored to the customer preferences. For example, a light traveling customer would prefer other bonus over an early check-in offering, since there can be minimum advantages for the light traveling customer to check in early.

In some embodiments, the bonus offerings can be negotiated. For example, the airlines can provide bonus offerings to the customers, and the customers can discuss about changing the offerings to better suite their preferences. The customers can propose new bonus offerings to the airlines. The bonus offerings can be custom offerings, e.g., the airlines can offer a bonus value, together with a list of offerings and prices. The customers can select offerings up to the bonus value.

FIGS. 5A-5C illustrate configurations for flight values according to some embodiments. FIG. 5A shows a portion of a display for flights resulted from a search for a flight itinerary. For example, a customer can send a travel request to a platform. The travel request can include a departure location, an arrival location, and a date of travel. The platform can search for available flights meeting the customer specifications. The platform then can show the searched flights, which can be sorted based on a customer preference, such as ordered by price. There can be multiple flights, of which three flights are shown. Information about the flights can be shown, such as the airline name, the departure time, the arrival time, and the airfare. Other information can be included, such as the name of the departure and arrival airports.

Other details of the flights can be shown, such as details of the total values, together with the total costs of the flights. The total values of the flights can include the airfares and other bonus offerings from the airlines, such as free Wi-Fi, free early boarding, free additional luggage, free bonus frequent flyer points, and free lounge access. The total costs of the flights can be the amounts that the customers are expected to pay, which can be the airfares. Pointers can be used, instead of the listing of the flight details. For example, the total values and/or the total costs can be pointers for detailed information related to the total values and/or total costs. Thus when the price of the total values/costs is pressed, another window can be open, showing the details of the total values/costs, respectively.

The difference in total values and total costs can be the bonus offerings that the airlines offer. For example, the bonus offerings for the United flight can be $250, which is the difference between the total value of $1100 and the total cost of $850.

The arrangement of the searched flights can be based on the saving amounts, e.g., the differences between the total values and the total costs. For example, the United flights can be shown first, for a saving of $250, even though the total cost for the United flight can be higher than the next few flights . . . . The Delta flight can be shown next, with a saving of $200. The American flight is shown after, with zero saving.

Alternatively, the arrangement can be ordered based on the total costs. In that case, the American flight can be shown first, followed by the Delta flight, and the United flight.

Other display configurations can be used, such as a configuration having a total cost column, and a total saving column, which is the difference between the total values and the total costs.

FIG. 5B shows a detailed description of the total value of $1100 for the United flight. The total value includes the total cost of airfare, together with the bonus offerings. There can be $250 saving, due to the bonus offerings, bringing the total value to $1100 from the total cost of $850. The bonus offerings can include free wifi, free early boarding, free additional luggage, free bonus frequent flyer points, and free lounge access. Other bonus offerings can be included, such as meal upgrade, seat upgrade, class upgrade, and free entertainment programs.

As shown, the bonus offerings are free, e.g., the bonus offerings represent a saving for the customer if selecting the flight. In some embodiments, the bonus offerings can represent a smaller saving, e.g., the customer can expect to pay for a portion of the offerings. For example, the bonus wifi can cost $50 at a regular purchase. It can be free as bonus offerings. Alternatively, it can cost a fraction of the regular price, such as costing $10 or $20. In that case, the total cost can increase, while the total value remains the same.

FIG. 5C shows a portion of a display for flights resulted from a search for a flight itinerary together with a recommendation 510, for example, from the platform based on the total saving amounts. Further, the total saving can follow a profile, either from a customer profile if the customer has one, or from a generic profile if the customer does not have a stored profile. In other words, the high amount of saving can only be valuable if it presents a high value to the customer, e.g., offering bonus services that the customer would actually use and enjoy.

In some embodiments, a comparison for different flights can be shown. For example, a customer can select three flights for comparison. The flight bonus information, e.g., the details of the total savings can be shown in a side-by-side listing. Other information can also be shown, such as the departure and arrival time.

FIGS. 6A-6C illustrate flow charts for a merchandising platform to display values of flights according to some embodiments. In FIG. 6A, operation 600 shows a total value and a total cost of a flight itinerary, wherein the total value comprises fare and bonus offerings for the flight. For example, a platform, such as a merchandising platform, can be configured to show values of the different flights. The values of the flights can include services available to the customer that can be offered by the airlines. The offered services can be free, e.g., bonus offering services, or can be offered at a discount or at regular price. Optionally, a total saving can be shown, which is the difference between a total value and a total cost. The values of the flights can show a customer about the offered services for the travel plan, and can allow a customer to know about the different flights, and can select a flight that best suites his preferences.

In FIG. 6B, operation 620 compares total values of multiple flight itineraries, wherein the total values comprise fares and bonus offerings of the flights. For example, a platform, such as a merchandising platform, can be configured to show different offering services for different flights. The comparison can allow a customer to quickly access the differences between flights, to select a flight that best suites his preferences.

In FIG. 6C, operation 640 searches for a flight itinerary. A customer can contact a platform, such as a merchandising platform, for a travel itinerary. The platform can search for flights meeting the customer request, e.g., satisfying the travel itinerary requirements.

Operation 650 displays results of the search, showing flight schedules meeting the search criteria. The display can be sorted, according to a default or a customer preference, such as sorted by price. The display can also include basic flight information, such as flight fares, departure time, arrival time, departure airport, arrival airport, layover time, and total travel time.

Operation 660 displays bonus offerings of the flight schedules or pathways to obtain the bonus offerings. In some embodiments, the display can be sorted based on a total saving.

Operation 670 recommends one or more flight schedules of the search results based on a profile of the customer with respect to the bonus offerings.

In some embodiments, the present invention discloses a merchandising platform that can be configured to promote merchandises for airlines, for example, when a customer is looking for air travel. The merchandising platform can present bonus offerings when showing the flights to the customer. The merchandising platform can offer a dynamic offering configurations, in which the offerings can be changed based on the traveling seasons, based on the customer profile, or can be custom, e.g., selectable by the customer.

FIGS. 7A-7D illustrate flow charts for merchandising configurations according to some embodiments. In FIG. 7A, operation 700 offers bonus offerings to a flight schedule based on seasonal conditions. For example, in low traveling seasons, e.g., when there are plenty of seats available, the airlines might want to offer bonus offerings to encourage the customers to select the flights. The amount of bonus offerings can be related to the supply of tickets, e.g., when the airlines need to sell more tickets, then a lot of bonus offerings can be made. If the flights are almost full, then there is no urgent need to sell more tickets, and the amount of offerings can be reduced, for example, to zero.

In FIG. 7B, operation 720 selects bonus offerings based on a profile of a customer. The merchandising platform can send the customer profile to the airlines, so that the airlines can select bonus offerings that are suitable to the customer, e.g., bonus offerings that the customer could be interested in having. Alternatively, the airlines can send a list of bonus offerings to the merchandising platform, and the merchandising platform can select bonus offerings based on the stored customer profile.

In FIG. 7C, operation 740 presents a list of bonus offerings for a customer to choose from. The merchandising platform can show the customer a list of bonus offerings for the customer to select. The bonus offerings can each have a value, and the merchandising platform can specify a total value for the offered offerings. This option can be good if the customer does not have a profile with the platform.

In some embodiments, a profile can be created or updated for the customer. For example, after offering a custom bonus offering, based on the selection of the customer, a profile can be created, if the customer does not already has a profile. Or an existing profile of the customer can be updated to reflect the preferences of the customer, based on the bonus offering selection.

In FIG. 7D, operation 760 displays flight schedules meeting search criteria. Operation 770 displays bonus offerings of the flight schedules or pathways to obtain the bonus offerings based on seasonal conditions or based on a customer profile. Operation 780 displays a list of bonus offerings or a pathway to obtain the list for a customer selection.

In some embodiments, the merchandising platform can communicate with the airlines to obtain the offerings, e.g., the bonus offerings. The offerings can be sent from the airlines to the merchandising platform, either before or during a customer request for air travel.

Figure 8A:
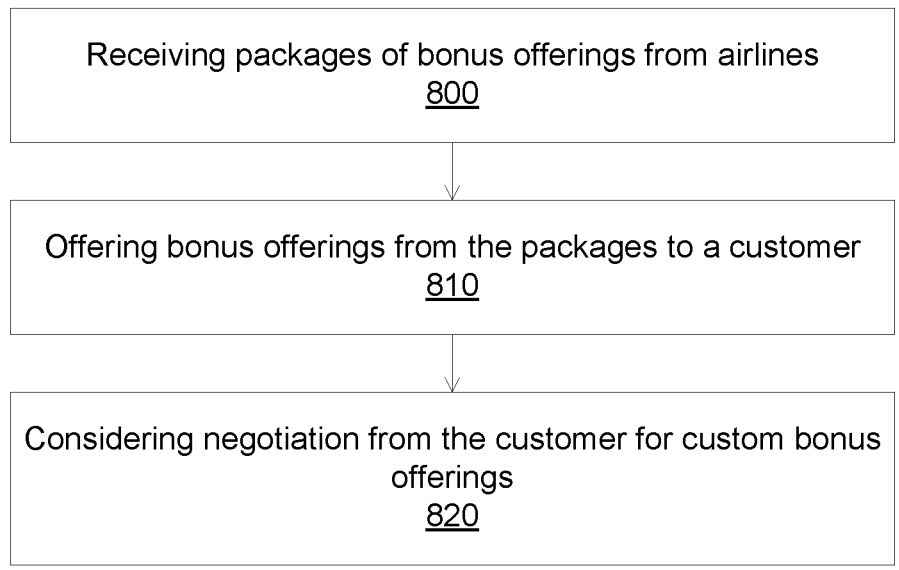
FIGS. 8A-8B illustrate flow charts for merchandising configurations according to some embodiments.
Figure 8B:
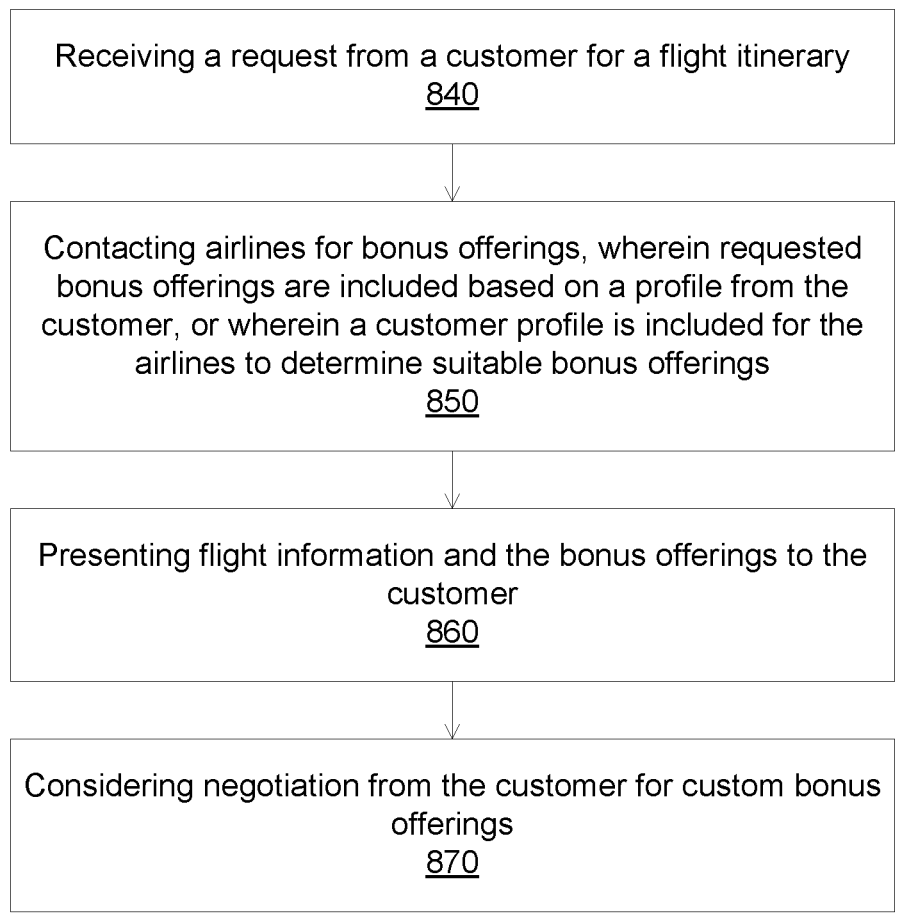

FIGS. 8A-8B illustrate flow charts for merchandising configurations according to some embodiments. In FIG. 8A, the platform can receive the bonus offerings as a package to offer to customers. Thus the platform already has the bonus offerings, for example, to be valid for a certain period of time. The platform then can present the bonus offerings on the flights that the airlines offer. The customers can negotiate the offerings.

Operation 800 receives packages of bonus offerings from airlines. Operation 810 offers bonus offerings from the packages to a customer. Operation 820 considers negotiation from the customer for custom bonus offerings.

In FIG. 8B, the platform can receive the bonus offerings together with the flight information. The platform then can present the bonus offerings in the searched flights. The customers can negotiate the offerings.

Operation 840 receives a request from a customer for a flight itinerary. Operation 850 contacts airlines for bonus offerings, wherein requested bonus offerings are included based on a profile from the customer, or wherein a customer profile is included for the airlines to determine suitable bonus offerings. Operation 860 presents flight information and the bonus offerings to the customer. Operation 870 considers negotiation from the customer for custom bonus offerings.

In some embodiments, the bonus offerings can be of minimum or zero costs to the airlines. For example, the bonus offerings can include services, which would not increase too much of a burden to the airlines. The bonus offerings can include free wifi, early check in, or free airport lounge access, which would not affect, or affecting very little, on the operating cost of the airlines. The bonus offerings can include upgrading to an economy plus class with a longer leg room seat, or an additional checked luggage, which would be offered during low traveling seasons when there are economy-class seats or luggage weights available.

In some embodiments, the bonus offerings can persuade the customer in selecting the flight. If the prices for different flights are similar or slightly different, the bonus offerings can show that the flight having the bonus offerings can be a significantly better choice. Thus the bonus offerings can help persuading the customer that the small increase in airfare can be worthwhile, especially if the bonus offerings can be tailored to suite the customer preferences. Even if the price difference is high, the bonus offering flights can show the customers the values of the flights, and in some cases, can convince the customers to take the high value flights.

In some embodiments, different flights can be shown together for a direct comparison. The direct comparison can show the customer the benefits of the bonus offerings, e.g., the differences in flight quality that the bonus offerings can bring.

In some embodiments, one or flight schedules can be recommended, for example, by the merchandising platform that presents the values of the different flight schedules. The recommendation can be generic, or can be based on a profile of the customer. The bonus offerings can be selected based on the profile, to offer what is considered valuable from the customer point of view.

In some embodiments, the present invention discloses a platform, e.g., a merchandising platform, for the airlines to offer merchandises to customers. The platform can accept requests from customers for travel needs, and then provide the customers with flight schedules meeting the customer requirements, together with bonus offerings for the flights. The bonus offerings can be based on a profile of the customers, to attract the customer attention. The platform can also suggest or make recommendation for one or more flight schedules, based on a profile of the customers.

In some embodiments, the platform can communicate with the airlines to obtain the bonus offerings, in addition to the airfares and schedules. For example, the platform can communicate with the airlines using NDC standards, and airline websites or API. The platform can also communicate with GDS network to obtain airfares and schedules, and contact the airlines through the airline websites or API to obtain the detailed information, e.g., the bonus offerings. The contact with the airlines can be limited to the top searched flights from GDS, in order to save time and expenses.

In some embodiments, the platform can present flight schedules and airfares, together with detailed characteristics of the flights and the bonus offerings.

In some embodiments, the values of a flight schedule can include the characteristics of the trip, which can include the discount or regular offerings from the airline. For example, the airlines can offer wifi, early check in, additional luggage, airport lounge access, and bonus frequent flyer points, at a discount or at a regular price. The merchandising platform can represent a platform for the airlines to show the airline merchandises to the customers.

FIGS. 9A-9C illustrate configurations for flight values according to some embodiments. FIG. 9A shows a portion of a display for flights resulted from a search for a flight itinerary.

Other information of the flights can be shown, such as the airfare, the amounts of bonus saving and the amounts of additional saving. The bonus saving can be the result of bonus offerings from the airlines, such as free wifi, and free lounge access. The customer does not expect to pay for the bonus offerings, resulting in a bonus saving. The additional saving can be the result of discount services from the airlines, for which the customer does not pay the full prices. Other offerings can be included, such as services at full prices. Details of the saving can be found by selecting, e.g., clicking, on the saving amount. For example, to see the details of the bonus saving of $100 for the United flight, the customer can click on the $100 area under Bonus saving headline. Similarly, to see the details of the additional saving of $75 for the United flight, the customer can click on the $75 area under Additional saving headline.

FIG. 9B shows a detailed description of the total bonus saving for the United flight. The bonus saving can include free wifi and free lounge access, for a total of $100 in saving. Other bonus offerings can be included, such as meal upgrade, seat upgrade, class upgrade, and free entertainment programs.

FIG. 9C shows a detailed description of the additional saving for the United flight. The additional saving can include a discount price for early boarding, a discount price for additional luggage, and a discount price for bonus frequent flyer points awarded to the customer. Other offerings can be included, such as meal upgrade, seat upgrade, class upgrade, and free entertainment programs.

FIGS. 10A-10B illustrate configurations for merchandising plattform displays according to some embodiments. FIG. 10A shows a portion of a display for flights resulted from a search for a flight itinerary.

Other details of the flights can be shown, such as the total costs and the details of the flight characteristics, including the physical specifications of the airplane and the services of the flight crew. The total costs can include the airfares, together with the purchase of offers from the airlines. A pointer, such as icons "Detail", can be used, instead of the listing of the flight details. Thus when the icon is pressed, another window can be open, showing the details of the flight characteristics.

Other merchandising information of the flights can be shown, such as the bonus offerings, the discount offerings, and the regular offerings from the airlines. A pointer, such as icons "Offer", can be used, instead of the listing of the merchandising offerings. Thus when the icon is pressed, another window can be open, showing the details of the offerings characteristics.

FIG. 10B shows an example of a list of offers for a searched flight. For example, when a customer selects the options icon for United flight, a window can be open, showing the details of the offerings.

The offerings can include bonus offerings, which can be characterized as zero offered prices, and a saving amount equaled to the regular price. As shown, the bonus offerings include free wifi, and free lounge access.

The offerings can include discount offerings, which can be characterized as having an offered price less than a regular price. As shown, the discount offerings include discounted early boarding, and discounted additional luggage.

The offerings can include regular offerings, which can be characterized as having an offered price similar to a regular price. As shown, the regular offerings include bonus frequent flyer points, seat upgrade (e.g., from economy seat to economy plus seat with larger seat and longer leg room), and business class upgrade. This is an example of the offerings. Other services of the airlines can be offered as offerings, e.g., the merchandising platform can be used to present merchandises, as a bonus, as a discount, or as a regular service or product to the customer.

There can be a selection of the offerings. For example, when the customer places a mark on the select box, the customer agrees to buy the offered service at the offered price. For example, marks can be made for the bonus offerings of free wifi and free lounge access, which do not change the total cost of the flight. The customer can de-select the bonus offerings. As default, there is no mark on the discount and regular offerings. If the customer is interested in any of the offerings, the customer can mark the selection, and the total cost and the total saving can be calculated accordingly.

In some embodiments, the present invention discloses a merchandising platform that can be configured to offer merchandises to traveling customers, such as customers searching for air travel. The merchandising platform can display information about the merchandises of the airlines to the customers, particularly when the customers are in the process of looking at air travel. For example, when the merchandising platform receive inquiries from a customer, such as the customer asking for a flight itinerary between cities, the merchandising platform can include the merchandise information to the flight information to send to the customer. The merchandising platform can also send the communication from the customer to the airlines, for example, when the customer desires to discuss or negotiate terms for the merchandises.

In some embodiments, the merchandise information can include the characteristics of the flights, bonus or discount offerings from the airlines, and regular offerings from the airlines.

FIGS. 11A-11C illustrate flow charts for a platform to display merchandising information in searched flights according to some embodiments. In FIG. 11A, operation 1100 shows flight information together with merchandising information to a customer. The platform can receive merchandising information from airlines to display together with the flight information, such as displaying offerings from the airlines during the display of flight schedules for a search of a travel itinerary for a customer. The merchandising information can include products and services that the airlines can offer to the customer, either at regular prices or at a discount.

In FIG. 11B, operation 1120 embeds merchandising information to a flight schedule to show to a customer. For example, the merchandising information can be shown together with the flight schedule, e.g., each flight schedule can have its own offers of merchandises from the airline operating or partnering the flight.

In FIG. 11C, operation 1140 searches for a flight itinerary. A customer can contact a platform, such as a merchandising platform, for a travel itinerary. The platform can search for flights meeting the customer request, e.g., satisfying the travel itinerary requirements.

Operation 1150 displays results of the search, showing flight schedules meeting the search criteria. The display can be sorted, according to a default or a customer preference, such as sorted by price. The display can also include basic flight information, such as flight fares, departure time, arrival time, departure airport, arrival airport, layover time, and total travel time.

Operation 1160 displays merchandising information in the flight schedules or pathways to obtain the merchandises.

Operation 1170 recommends one or more flight schedules of the search results based on a profile of the customer with respect to the merchandising information.

In some embodiments, the present invention discloses a platform to provide a travel service to customers. The platform can have flexible protocols to support merchandising information communication, together with modern retailing practices such as personalized and customized merchandising offers. Other details of the platform can be found in U.S. Non-Provisional patent application Ser. No. 15/192,775, filing date Jun. 24, 2016, entitled "Travel Distribution System", which claims priority from U.S. Provisional Patent Application Ser. No. 62/184,220, filing date Jun. 24, 2015, entitled "Travel Distribution System", and from U.S. Provisional Patent Application Ser. No. 62/204,977, filing date Aug. 14, 2015, entitled "Travel Distribution System", of the same inventor, all of which are hereby incorporated by reference in their entirety.

In some embodiments, the present platform can include communication to the airlines through a GDS network, such as Amadeus GDS, Sabre GDS, and Travelport GDS. GDS is a network between airlines and travel agents. In the early days of computerized reservations systems a flight ticket reservation is not possible without it. In the computer age, many airlines have started to sell directly to their wholesale and retail customers, such as using API or websites. Part of the reasons is that GDS network can be slow to respond to individual airline needs, such as including special promotion programs so that customers can purchase. For example, it is difficult for airline to offer and for travel agencies to obtain merchandise information through GDS.

Airlines have provided websites for consumers, who can have the ability to view rich content, including merchandising information. Airlines also can provide Application Programming Interface (API) for entities, such as agencies, who are interested in obtain detailed information, such as merchandising information. Airlines can also use NDC standards, which can distribute rich air content to the platform.

In some embodiments, the present invention discloses a merchandising platform, e.g., a platform that can be configured to present merchandises to customers looking to travel, that can communicate with airlines from different networks, such as getting information from airlines from GDS network and getting information from airlines from internet network, e.g., through the airline websites, airline API or through NDC standards with the airlines. The GDS network can have access to many airlines at once, so a communication with the GDS network can provide flight schedules and airfares of multiple airlines. After getting the flight schedules and airfares, individual airlines can be contacted to get other information, such as flight characteristics and merchandising information.

In some embodiments, the present invention discloses a complementary search methodology, which includes first searching through GDS network for flights and basic information of the flights e.g., flight schedules and fares, optionally sorting through the searched flights, and then perform additional searches through individual airlines, e.g., at airline websites, using airline API, or using NDC standards, for detailed information of the flights, such as the top flights resulted from the sort process.

Advantages of the complementary search methodology, e.g., communication with GDS and individual airlines, can be a faster response. For example, a search with the GDS network can generate multiple flights meeting the requirements of a customer, such as the departure and arrival airports and the date of travel. The flights can be sorted based on a customer preference, such as sorted by price. The airlines of the top sorted flights, such as top lowest price flights, can be contacted for other information regarding the flights. Since a top few flights can be searched for detail information, the platform can quickly display the results of the top few flights, showing the flight schedules and airfares (from GDS network) and other information (from individual airlines). The rest of the flights can be searched for detailed information at a later time, e.g., after showing the top flight data to the customer.

The platform can include an interface for communicating with airlines through NDC standards, for communicating with the airlines through their API or through their websites, for example, through the internet. In some embodiments, the platform can communicate with airlines that do not use NDC standards. Thus after getting the searched flights from GDS, the platform can search for detailed flight information in the internet, e.g., through airline API or through the individual web sites of airlines that do not use NDC standards.

In some embodiments, the platform can search for flight information from airlines using NDC standards before searching for flight information from airlines through the airline API or websites. Thus for airlines using NDC standards and providing API or websites, the platform can communicate with the airlines using NDC standards, and without the need for communicating through the API or websites.

In some embodiments, the platform can search for flight information from airlines through the airline API or websites before searching for flight information from airlines using NDC standards. Thus for airlines using NDC standards and providing API or websites, the platform can communicate with the airlines using the API or websites, and without the need for communicating using NDC standards.

In some embodiments, the platform can further search for flight information from airlines not participated in GDS network. The flight information can include the flight schedules, airfares, and other detailed information such as merchandising information. The search with airlines not participated in GDS network can assist the complementary search methodology, e.g., the search in GDS network followed by individual airlines, for example, to cover airlines in GDS network and airlines outside of GDS network.

In some embodiments, the platform can communicate with GDS network to get flight schedules and fares of airlines participated in the GDS network. The top flights, e.g., according to a sort of the flights searched through the GDS network, can be further searched, through the individual airlines offering the top flights, to obtain detailed information, such as merchandising information.

Afterward, the platform can communicate with airlines not participated in the GDS network, to obtain additional flight schedules and fares, together with other detailed information. The additional flights can be sorted, for example, according to the same sort of the GDS flights, and the resulted flights can be presented together with the top flights. The resulted flights can be merged with the top flights and sorted again for ranking before presented to the customer. Alternatively, the additional flights and the GDS searched flights can be sorted, and the results presented.

In some embodiments, the platform can first search for flight information from airlines using NDC standards, e.g., before performing the complementary search. The flight information can include the flight schedules, airfares, and other detailed information such as merchandising information. After searching for airlines using NDC standards, the platform can continue the search for airlines in GDS network, and then complement the flight information in the GDS search with a search using airline websites and/or API. The complementary search can be for top flight in the GDS search. Optionally, the search can further be continued for airlines not using NDC standards and not participated in GDS network.

In some embodiments, the platform can maintain a list of airlines not participated in GDS network. Thus, after a complementary search, e.g., after the GDS network is searched for flight meeting a customer input, the airlines in the list can be contacted to search for additional flights. The list can be divided into sub lists in which airlines in a first sub list can be searched using airline website, airlines in a second sub list can be searched using airline API, and airlines in a third sub list can be searched using NDC standards.

In some embodiments, the platform can maintain a list of airlines, with an annotation for each airline. For example, an airline in the list can be marked as participated in GDS network. Another airline in the list can be marked as not participated in GDS network. The list can be used to perform a complementary search, followed by searches for airlines not in GDS network.

In some embodiments, in the list of airlines, there can be a first sub-list of airlines using NDC standards, e.g., the airlines in the first sub-list can be searched using NDC standards. The list of airlines can include a second sub-list, which can contain airlines providing airline API, e.g., the airlines in the second sub-list can be searched using the airline API. The list of airlines can include a third sub-list, which can contain airlines providing airline websites, e.g., the airlines in the third sub-list can be searched using the airline websites. The list of airlines can include a fourth sub-list, which can contain airlines using GDS, e.g., the airlines in the fourth sub-list can be searched using GDS. The list can be mutually exclusive, e.g., an airline only appears in one sub list. Alternatively, an airline can appear in more than one sub list. For example, an airline can be searched using GDS and using airline API.

In some embodiments, the list of airlines can be configured to specify which airlines to be searched by which protocols, e.g., each airline in the list of airlines can be classified as to be searched using NDC standards, using airline API, using airline website, or using GDS network. For example, the airlines in the list of airlines can be grouped into multiple sub-lists, with the airlines in each sub-list can be searched using a protocol.

In some embodiments, a priority scheme can be included, either in the list of airlines or in a separate element. The priority scheme can specify which protocol can be searched first. For example, a priority scheme can specify that the airlines in the list of airlines are configured to be searched using NDC standards first, before API protocols, websites, and GDS network. For example, the airlines in the list of airlines are configured to be searched using NDC standards first, followed by searching using the GDS network and API protocols or websites (for a complementary search for airlines in GDS network, excluding airlines using NDC standards), and followed by using API protocols or websites (for airlines not in GDS network and not using NDC standards). A list of airlines can be formed to reflect the priority scheme. For example, the list of airlines can include airlines using NDC standards, e.g., these airlines can be searched first using the NDC standards. The platform can consult the list to identify airlines that can be searched using NDC standards. The platform then can search through the GDS network, excluding the airlines in the NDC list. The list of airlines can include airlines not participated in GDS network and not using NDC standards. Thus after searching for airlines using NDC standards and for airlines in GDS network (excluding airlines using NDC standards), the platform can consult the list to identify airlines that can be searched using airline websites or API.

Another priority scheme can specify that airlines in GDS network are searched first, followed by a complementary search for top GDS-searched airlines using NDC standards before using airline websites or API. A search for airlines not participated in GDS network can followed, in which the airlines using NDC standards is searched first, followed by airlines using websites or API. A list of airlines can be formed to reflect the priority scheme. For example, the list of airlines can include airlines in GDS network that can be searched using NDC standards, and airlines in GDS network that can be searched using websites of API. Thus after performing a GDS search and sort, the platform can consult the list to identify the top flight airlines that can be complementary searched using NDC standards or using websites of API.

The list of airlines can include airlines not participated in GDS network that can be searched using NDC standards, and airlines not participated in GDS network that can be searched using websites of API. Thus after performing the complementary search, e.g., searching in GDS network followed by searching using NDC standards, websites or API for top flights, the platform can consult the list to search for airlines not participated in GDS network using NDC standards, followed by a search for airlines not participated in GDS network using websites of API.

In some embodiments, the present invention discloses a merchandising platform with seamless migration from different searches, e.g., from searches using NDC standards to searches using airline API or websites to searches using GDS network. Airlines can move between groups, for example, joining GDS or leaving GDS, implementing NDC standards or not implementing NDC standards, implementing airline API or not implementing airline API, implementing airline website or not implementing airline website. The merchandising platform can have a seamless migration regarding the moving of airlines between the groups.

In some embodiments, the seamless migration can be performed by updating the list of airlines when a characterization of an airline changes. For example, the list of airlines can be updated to classify an airline as the airline to be searched using NDC standards when the airline is configured to use or start to use NDC data transmission standards, e.g., when the airline is previously configured to be classified as the airline to be searched using the airline API, using the airline website, or using GDS. The list of airlines can be updated to change the search scheme for an airline when the airline migrates from GDS network to NDC standards.

The update of the airline list can be performed manually, e.g., by an operator observing that the status of an airline has changed. The update of the airline list can be performed automatically, e.g., by a program running to check whether the status of an airline has changed. For example, a program can communicate with an airline using NDC standards. If there is a response, then the airline has implement NDC standards, and thus the status of the airline has changed to having NDC standards.

In some embodiments, the present invention discloses a method for comparing values of different flight itineraries. The method can include obtaining monetary prices of different flight itineraries, such as the ticket prices of the flight itineraries. The characteristics of the flight itineraries can also be obtained, together with information on optional discounts or bonuses of the flight itineraries offered by the airlines. The characteristics, discounts and bonuses can be converted to monetary values, such as using a look up table or a profile of the user. For example, if the user prefers upgrade, a bonus of free upgrade can be assigned a high monetary value. If the user is not concern with free Wi-Fi, extra legroom, or early check in, the bonus or discount of these amenities can be assigned a low monetary value, or can be valued at zero monetary.

The values of the different flight itineraries can be calculated based on the difference between the monetary prices and the monetary values of the flight itineraries. The values can be used to rank the flight itineraries, instead of the ticket prices.

In some embodiments, the present invention discloses methods and systems for managing frequent flyer points, e.g., miles, kilometers, or segments, for customers. To encourage loyalty, airlines offer frequent flyer programs, which can award frequent flyer points to passengers enrolled in the programs. The awarded frequent flyer points can be redeemed for air travel or other rewards.

The present frequent flyer management can assist a customer to manage his frequent flyer points from frequent flyer programs of different airlines. In general, the frequent flyer points can be poorly managed by the customer, for example, due to the customer lack of attention to the frequent flyer points, due to the customer lack of knowledge about the potential benefits of frequent flyer points, and also due to the customers not familiar with the rules and regulations of the frequent flyer programs.

In some embodiments, the present invention discloses a platform to manage frequent flyer points for customers. The platform can make recommendation or perform actions that maximize values for the customer, e.g., benefiting the customers in regard to the frequent flyer points. For example, the platform can sign up for frequent flyer programs. The platform can redeem the frequent flyer points for tickets or merchandises. The platform can select purchases with lowest prices after taken into account the values of the frequent flyer points. The platform can select purchases to have additional frequent flyer points to move up in frequent flyer status for better airline perks.

Figure 12A:
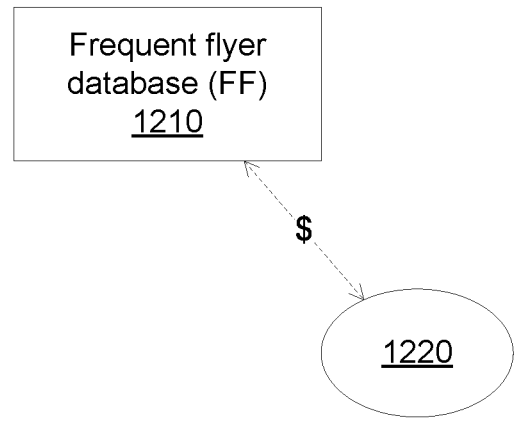
FIGS. 12A-12B illustrate configurations for a frequent flyer management according to some embodiments.
Figure 12B:
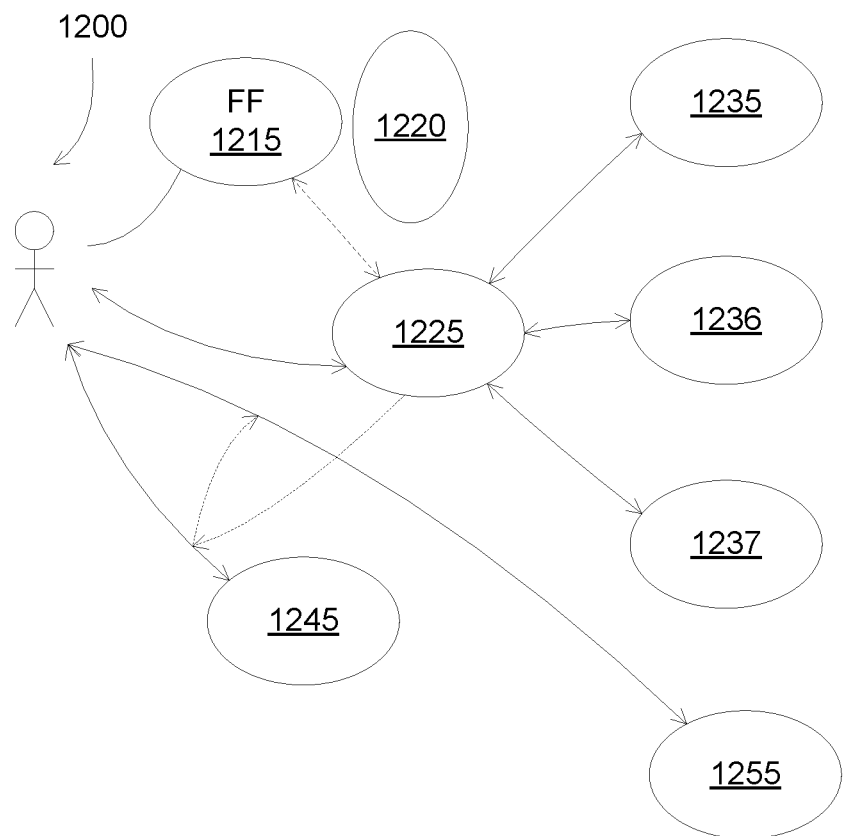

FIGS. 12A-12B illustrate configurations for a frequent flyer management according to some embodiments. In FIG. 12A, a platform 1220, such as a program running on a server, on a data processing system, or on a portable device, can be coupled to a frequent flyer database 1210, which can store information about one or more frequent flyer programs of one or more customers. The platform can manage the frequent flyer points in the frequent flyer database, such as treating the frequent flyer points as currency, e.g., cash or credit, for activities that offer or accept frequent flyer points. A customer can sign up with the platform, to let the platform manage the frequent flyer points of the customer for different frequent flyer programs with different airlines. For example, the customer can provide user names and passwords of his various frequent flyer programs to the platform, so that the platform can have access to the information about the frequent flyer programs of the customer. The platform can download the frequent flyer program information to the frequent flyer database, which can be periodically updated.

The platform can optimize actions of the customer with respect to the frequent flyer points, such as redeeming or suggesting redemption of frequent flyer points that are about to be expired, or recommending flight itineraries that a combination of frequent flyer points and cash payment is the most cost-effective options. In the event that the customers do not already have an open frequent flyer program with the airlines, the platform can suggest to the customer to sign up, or the platform can sign up with the airlines, on behalf of the customer, to start a frequent flyer program with the airlines under the customer name.

In FIG. 12B, a customer 1200 can sign up to frequent flyer programs 1215 with one or more airlines. For example, the customer can have a frequent flyer program with United airlines, and another frequent flyer program with American airlines. Managing these frequent flyer programs can be time consuming for the customer. For example, the customer needs to keep track of the number of frequent flyer points in each frequent flyer program, and the expiration date of these points. Further, there can be many rules and restrictions for using these points in the frequent flyer programs, and these rules and restrictions can be frequently changed.

A platform 1225 can be used to manage the frequent flyer programs, e.g., handling the frequent flyer points in the frequent flyer programs of the customer with the airlines. In addition to managing the frequent flyer programs, the platform can also function as a travel agent, e.g., handling the travel needs of the customer. Thus the platform can manage the frequent flyer points in the frequent flyer programs in conjunction with the travel booking and reservation, or with other activities that can accept the frequent flyer points. For example, if the customer desires to get a flight from Delta airlines, and the customer does not have a frequent flyer program with Delta, the platform can suggest or perform the enrollment into a frequent flyer program with Delta for the customer. If the customer desires to get a flight from United airlines, and the customer frequent flyer points with United that are about to be expired, the platform can suggest or perform the redemption of the frequent flyer points for the United flight. Other activities can also be suggested or performed by the platform with respect to the accumulation and usage of the frequent flyer points, for example, to optimize or to maximize the values to the customer.

The platform 1225 can be linked to the frequent flyer programs 1215 of the customer 1200. For example, the customer can provide accesses, such as usernames and passwords, of the frequent flyer programs with different airlines to the platform. Thus the platform can know the information of the customer regarding the frequent flyer programs. The platform can access the frequent flyer programs every time there is a need to know the information of the frequent flyer points. Alternatively, the platform can download the frequent flyer information, e.g., the number of the frequent flyer points and the expiration of these points, to a frequent flyer database. The information in the frequent flyer programs does not change often, e.g., the number of frequent flyer points changes only when the customer travels with the airlines, meaning accumulating additional frequent flyer points for each flight segment, or when the customer redeems the frequent flyer points, meaning reducing the number of frequent flyer points in exchange for the flight ticket. Thus occasional downloads, such as every week, every month, or when there is a customer activity, from the frequent flyer programs can be adequate.

In operation, a customer can contact the platform, for example, to inquire about a travel plan, such as checking for flight schedules between two cities on a certain travel date. The platform can search airlines 1235 and 1236, for example, using NDC protocols, airline websites, or airline API, or the platform can search travel server, such as a GDS service 1237, for flight itineraries meeting the customer specifications.

The platform can access the frequent flyer programs 1215, for example, to consider the frequent flyer points in these programs in calculating the costs of the searched flight itineraries. For example, if there are enough frequent flyer points for redemption, and these points are about to be expired, the platform can recommend redeeming these frequent flyer points, e.g., selecting the flight itinerary of the airline that the frequent flyer points belong to, even though the cost of the flight itinerary can be higher than other flight itineraries.

Also, since many airlines have formed an alliance, in which travel mileage can be shared, the cost of air travel can be calculated after taken into account the frequent flyer points to an alliance partner. For example, Finnair codeshares with oneworld partners, which include American airlines. Thus a more expensive ticket with Finnair having frequent flyer points can be cheaper than a cheaper ticket with another airline not having frequent flyer points, since the travel mileage with Finnair can be selected to be frequent flyer points with American airlines.

Further, the platform can keep track of the details of the frequent flyer programs, and can inform, suggest, or make recommendation to the customer of how to take the most advantages of the frequent flyer programs. For example, the platform can remind the customer about the expiration date of the frequent flyer points, which let the customer to use the frequent flyer points before the expiration date. The platform can inform the customer regarding promotion programs of the airlines, or from other companies, such as credit card companies, about the possibility of getting bonus frequent flyer points by performing certain actions, such as getting a credit card.

Further, the platform can assist the customer with other activities that relate to frequent flyer points, e.g., using frequent flyer points as cash or credit. For example, the customer can shop 1245 on the internet, such as looking to buy a magazine subscription. The platform 1225 can intercept the shopping activity, informing the customer that frequent flyer points can be used to purchase magazine subscription. The platform can direct the customer to the airline websites 1255 for purchasing the magazine subscription with frequent flyer points.

Figures 13A, 13B, 13C:
FIGS. 13A-13C illustrate flow charts for managing a frequent flyer program according to some embodiments.

FIGS. 13A-13C illustrate flow charts for managing a frequent flyer program according to some embodiments. In FIG. 13A, operation 1300 manages frequent flyer points to maximize a frequent flyer value for a customer. For example, a customer can supply information regarding his frequent flyer programs to a platform to allow the platform to manage frequent flyer points in the frequent flyer programs. The management of the platform can save the customer significant time, for example, to keep track of the details of the frequent flyer programs to maximize the benefit of the frequent flyer programs, together with provide recommendations to all activities related to frequent flyer points, e.g., not just for air travel but also for other activities such as shopping with frequent flyer points or getting a credit card for bonus frequent flyer points.

In FIG. 13B, operation 1320 suggests or performs actions related to frequent flyer programs to a customer, by a platform. For example, a customer can access the platform for activities that frequent flyer points can play a role. The actions or activities can include activities that can use the frequent flyer points, such as redeeming the frequent flyer points for airline tickets, using frequent flyer points to upgrade tickets, or for merchandises sponsored by the airlines. The actions or activities can include activities that can add frequent flyer points, such as sign up to a frequent flyer program with not already have one, or sign up to a credit card or an activity that offers bonus frequent flyer points. The actions or activities can include informative activities in which the platform notifies the customer of potential actions that can be of benefits, such as expiration date, or airline promotions regarding frequent flyer points, or purchasing a more expensive ticket to get additional miles, which can help move the customer to a higher status level and therefore get more perks such as upgrades, lounge access, priority boarding etc.

The platform can have detailed knowledge of the frequent flyer programs of the airlines, such as the expiration date of the frequent flyer points, which flight segments can have how many frequent flyer points, and the restriction dates for redeeming frequent flyer points. Thus the platform can make recommendation when purchasing airfare tickets, for example, to calculate the effective costs, not just the face values of the airfare, of different flight itineraries so that the customer can perform a comparison. The effective costs can include the airfare, e.g., the cost of purchasing the tickets, subtracting the values of the frequent flyer points accumulated by flying. The platform can provide suggestions of using frequent flyer points for purchase when the customer is shopping. For example, a customer can shop for headphones on the internet, such as by browsing Amazon for headphone selections. The platform can notify the customer of incoming deadlines related to frequent flyer points, such as the date that some frequent flyer points will expire, or the promotion deadlines for frequent flyer activities.

In FIG. 13C, operation 1340 receives a request from a customer for a flight itinerary. For example, after receiving the request, which can includes a departure location, an arrival location, and a date of travel, a platform can search for flight schedules from airlines using NDC protocols, airline website, airline API, or using an airline network such as GDS. Multiple searched flight schedules can be found, with detail information related to the flight schedules, including airfare and amenities such as having frequent flyer points or not, and if having frequent flyer points, how many frequent flyer points for the flight schedules. Operation 1350 suggests at least a favorable flight schedule, wherein the flight schedule is favorable due to a frequent flyer element. For example, with airlines forming alliances, flying in one airline can receive frequent flyer points in another airline within the alliance. Thus flying with a small airline with frequent flyer points, though with higher published fare, can be more cost effective than flying with another airline without frequent flyer points and lower airfare. The frequent flyer points, awarded by flying with the small airline, can be attributed to a favorite airline of the customer, provided that the favorite airline belongs to the same alliance as the small airline.

In some embodiments, the present invention discloses methods and systems for having access to data in the frequent flyer programs of the customers. Each customer can have a frequent flyer program with each airline. The frequent flyer programs can be password protected, and only the customers with proper credentials can access the data in the frequent flyer programs.

In some embodiments, the frequent flyer programs can be stored separately by the airlines, e.g., in a different database than the flight schedules. The customers can appoint the platform to manage the frequent flyer programs, for example, by providing the credentials, e.g., usernames and passwords, to the platform so that the platform can access the data in the frequent flyer programs. The platform can access the frequent flyer programs, for example, by logging in the frequent flyer program accounts of the customers. The platform can access the rules, regulations, and restrictions of the frequent flyer programs imposed by the airlines. With knowledge of the frequent flyer programs, the platform can suggest or perform actions that can maximize the benefits of the frequent flyer programs.

In some embodiments, the platform can download the data in the frequent flyer programs of the customers to a database, for example, for ease of access. Since the frequent flyer data do not change rapidly, the stored database can accurately reflect the data in the frequent flyer programs of the customers. The downloading process can be performed every week, every month, or anytime there is an activity of the customers. Other download frequency can be used, such as every day.

Figures 14A, 14B:
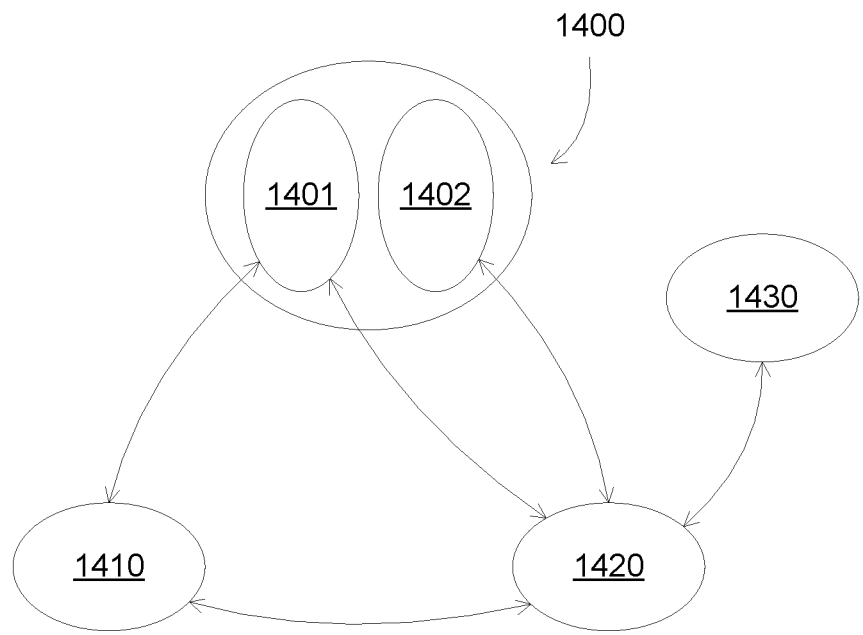
FIGS. 14A-14B illustrate configurations for accessing frequent flyer programs according to some embodiments.

FIGS. 14A-14B illustrate configurations for accessing frequent flyer programs according to some embodiments. In FIG. 14A, an airline 1400 can have multiple databases, including a database 1401 for storing data on frequent flyer programs, and a database 1402 for storing flight schedule. The airline 1400 can have other databases, such as a database for fare information. The databases can be independent and separate, e.g., not connecting to each other.

A platform 1420 can have access to flight schedule and fare databases of the airline, for example, through NDC, website of airline API, or through the airline network (such as GDS (network), for searching for flight itineraries. In operation, a customer 1410 can contact the platform 1420 for travel needs, such as for a vacation. The customer can provide a departure location, an arrival location, and a date of travel. The customer can include special requests, such as asking for lowest fare in exchange for a flexible travel date. The platform can search the airlines and/or the airline network, e.g., contacting the flight schedules and fares of the airlines, to find flights suitable to the customer need.

The platform can be configured to manage the frequent flyer programs for the customer. For example, the platform can link to the frequent flyer database 1401 of the airline 1400, using the credential of the customer, e.g., the customer has appointed the platform to be a manager for his frequent flyer programs, such as by giving the platform the usernames and passwords for the frequent flyer programs. The platform can copy the data in the frequent flyer programs, and store the data in a local database 1430 for ease of access. The platform can periodically access the frequent flyer programs to update the data in the frequent flyer programs. With access to the frequent flyer programs, the platform can manage the frequent flyer programs for the customer, such as maximizing the values and benefits of the frequent flyer programs, or using the frequent flyer miles to purchase airline tickets or other travel products.

FIG. 14B shows a flow chart for accessing frequent flyer programs. Operation 1490 accesses a frequent flyer program of a customer, by a platform. The platform can obtain credential to the frequent flyer program from the customer for accessing the frequent flyer program. Operation 1491 downloads data in the frequent flyer program to a local database. The download process can be repeated at a periodicity, such as every day, every week, or every month. The downloading process can be downloaded every time the customer contacts the platform.

In some embodiments, the present invention discloses a platform, e.g., a program running on a data processing system, such as on a computer, a server, or a mobile device, that can make recommendations or perform recommended suggestions to a customer regarding actions or activities related to the frequent flyer programs of the customer with one or more airlines.

The platform can sign up for a frequent flyer program if the customer does not have one. The automatic signing up for frequent flyer programs can save time for the customer, since the platform can take care of all the necessary steps for frequent flyer enrollment. For example, the customer can request the platform to purchase a flight ticket with an airline. If the customer does not have a frequent flyer program with the airline, or with a partner of the airline, the platform can suggest the customer to sign up for a frequent flyer program with the airline or with a partner of the airline. The platform also can perform the enrollment for the customer with the airline or with a partner of the airline. The platform can also make recommendation for which airline to enroll for a frequent flyer program. For example, if the customer is based in the U.S., and fly mainly within the U.S., then a frequent flyer program with an U.S. airline can be more beneficial, since the frequent flyer points with the U.S. airline can be easily redeemed for a domestic trip with the U.S. airline. The selection of frequent flyer with airline partners can be accomplished since most airlines form codeshare partners, e.g., forming alliance, and flying with an airline in the alliance can receive frequent flyer points with any airline in the alliance.

The platform can redeem the frequent flyer points for traveling purposes, for example, to buy or upgrade flight tickets, or to reserve hotel or car rental for the customer. The customer can instruct the platform to redeem the frequent flyer points, or the platform can suggest redemption of the frequent flyer points. For example, if the customer selects a flight itinerary with an airline, the platform can suggest paying for the trip with frequent flyer points with the airline. Since the platform has access to the frequent flyer programs of the customer, the platform can know whether or not there is enough frequent flyer points for redemption for the selected flight itinerary. If the trip is a round trip, the platform can suggest using frequent flyer points for one way or for both ways, depending on the available frequent flyer points. The platform can redeem the frequent flyer points for the total ticket price, or for a partial ticket price, such as redeeming one way ticket price for a round trip purchase, or redeeming a flight segment for a multi-segment trip purchase, or redeeming a portion of a flight segment.

The platform can also suggest using frequent flyer points for upgrading flight tickets. For example, if the customer prefers business class travel, the platform can suggest upgrade an economy class ticket to a business class, if there is enough frequent flyer points.

In addition, the platform can suggest, or make recommendation, to use the frequent flyer points during a request for a flight itinerary from the customer, such as after searching for flight schedules that the customer desires. Typically, a search can result in many flight schedules. The platform can suggest the most suitable flight schedules based on at least a frequent flyer point consideration. For example, the platform can suggest redeeming frequent flyer points for a flight schedule, resulting in zero airfare cost for the customer. Even though there can be other flight schedules with lower published airfares, the actual cost for the recommended flight schedule is lowest, e.g., zero cost due to the frequent flyer redemption.

The platform can also suggest using the frequent flyer points for a portion of the flight, such as for a one way flight in a round trip, for a flight segment in a multi-segment trip, or for a portion of a flight segment. The rest of the trip can be paid with currency. For example, frequent flyer points can be purchased to increase the number of frequent flyer points to be enough for a flight. The actual cost, e.g., the out-of-pocket cost to the customer, can be calculated to provide a comparison between various options, so that the platform can suggest or make recommendation for the best choices. For example, the options can include paying for tickets, purchase frequent flyer points to add to the existing frequent flyer points to redeem for the tickets (if there are not enough frequent flyer points), or to redeem frequent flyer points for the total tickets (if there are enough frequent flyer points). The redemption of frequent flyer points can be calculated for high season, e.g., higher ticket price period, to maximize the value of the frequent flyer points.

Also, the platform can suggest searching for economy flights, and then use frequent flyer points to upgrade to business class. For example. if the customer prefers business class, which can be specified in the customer profile, the platform can search for both economy class and business class flights. The searched results can be tabulated and compared. If the cost of the business airfare is not much different than the cost of the economy class airfare, then the business class flight can be recommended. If the cost of the business airfare is much higher than the cost of the economy class airfare, then the economy class flight can be recommended, together with using frequent flyer points to upgrade to business class.

The platform can suggest hotel and car rental accommodation for the customer, such as using frequent flyer points to pay for hotel stay or for car rental.

In some embodiments, the platform can count frequent flyer points in evaluating a total ticket price. In general, frequent flyer programs in lesser-known airlines, especially foreign airlines, are not very beneficial, since there can be few routes that the airlines serve that can be useful to the customer. However, since airlines have formed alliances, flying with the lesser-known airlines can gain frequent flyer points with another airline in the alliance. Thus the frequent flyer programs in the lesser-known airlines can become profitable, e.g., the frequent flyer points gained by flying with the lesser-known airlines can be attributed to an airline of the customer choosing.

In some embodiments, the platform can calculate values of the frequent flyer points on the fly when comparing ticket prices for different flight itineraries. For example, the platform can calculate the currency equivalent of the frequent flyer points with regard to buying tickets, hotels, car rental, or other merchandises that the airlines offer. The calculation can be specific, e.g., in particular with the products that the frequent flyer points are getting. For example, when buying an airfare ticket, the value of the frequent flyer points can be calculated for that airfare ticket, using the number of frequent flyer points used, and the number of frequent flyer points awarded for the flight.

The platform can calculate the values of the tickets, taken into account the values of the frequent flyer points. For example, an airfare without frequent flyer points can have the value of the price of the ticket. The cost of an airfare, though with a lesser-known airline, can be calculated by subtracting the value of the frequent flyer points from the price of the ticket. Also, a few frequent flyer points can be purchased, to bring the number of frequent flyer points to an adequate level for redemption. A higher price ticket can be purchased to bring the number of frequent flyer points to an adequate level for redemption, especially if the existing frequent flyer points are close to the expiration date. Further, a higher price ticket can be purchased to bring the number of frequent flyer points to an adequate level for a higher class in the frequent flyer program, which can bring better privileges or side benefits.

In some embodiments, the platform can assist the customer in shopping for merchandises using frequent flyer points. The platform can know the merchandises that the airlines offer, such as magazine subscriptions, dining experience, sports and concert tickets, cruises, gift cards, etc. The platform can make suggestion to the customer to use the frequent flyer points to shop at airline shopping centers. For example, the platform can observe that the customer is shopping for a product on the internet, such as looking for headphones on Amazon website. The platform can intercept to make suggestion that the customer can shop for the headphones using frequent flyer points, such as using United frequent flyer points to shop for headphones on United websites.

In some embodiments, the present invention discloses a computer program having machine-readable instructions to cause a processing device to implement any one of the methods described above. The present invention also discloses a machine readable storage, having stored there on a computer program having a plurality of code sections for causing a machine to perform the various steps and/or implement the components and/or structures disclosed herein. In some embodiments, the present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, or a nonvolatile electronic memory. The software program may be run on a variety of devices, including a processor or a processing device to perform any one of the methods described above.

In some embodiments, the methods can be realized in hardware, software, or a combination of hardware and software. The methods can include computer-implemented methods, using a computer or a data processing system to execute the methods, including executing operations by a hardware processor. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system with a computer program that can control the computer system so that the computer system can perform the methods. The methods also can be embedded in a computer program product, which includes the features allowing the implementation of the methods, and which when loaded in a computer system, can perform the methods.

In some embodiments, the present invention discloses a system having a non-transitory memory and one or more hardware processors coupled to the non-transitory memory and configured to read instructions from the non-transitory memory to cause the system to perform operations necessary to perform the methods described above.

The terms "computer program", "software", "application", variants and/or combinations thereof, in the context of the present specification, mean any expression, in any language, code or notation, of a set of instructions intended to cause a system having an information processing capability to perform a particular function either directly. The functions can include a conversion to another language, code or notation, or a reproduction in a different material form. For example, a computer program can include a subroutine, a function, a procedure, an object method, an object implementation, an executable application, an applet, a servlet, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a graphical display monitor with a graphics screen for the display of graphical and textual information, a keyboard for textual entry of information, a mouse for the entry of graphical data, and a computer processor. In some embodiments, the computer processor can contain program code to implement the methods. Other devices, such as a light pen (not shown), can be substituted for the mouse. This general purpose computer may be one of the many types well known in the art, such as a mainframe computer, a minicomputer, a workstation, or a personal computer.

Figure 15:
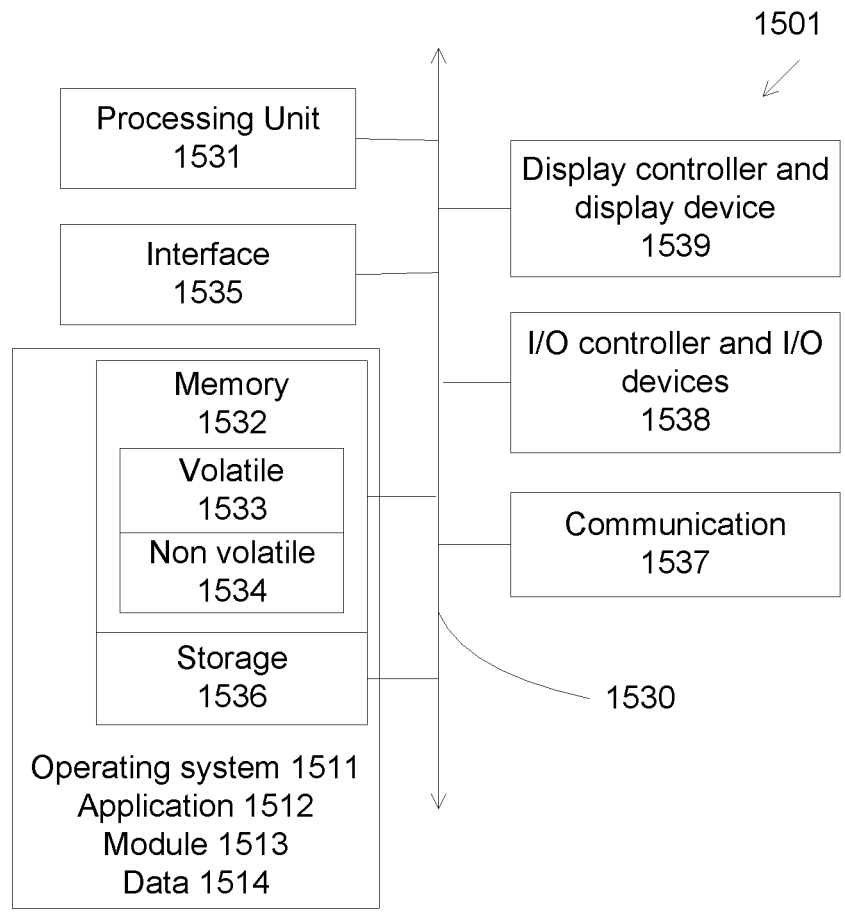
FIG. 15 illustrates a computing environment according to some embodiments.

FIG. 15 illustrates a computing environment according to some embodiments. An exemplary environment for implementing various aspects of the invention includes a computer 1501, comprising a processing unit 1531, a system memory 1532, and a system bus 1530. The processing unit 1531 can be any of various available processors, such as single microprocessor, dual microprocessors or other multiprocessor architectures. The system bus 1530 can be any type of bus structures or architectures. The system memory 1532 can include volatile memory 1533 and nonvolatile memory 1534.

Computer 1501 also includes storage media 1536, including removable storage media or nonremovable storage media, and volatile or nonvolatile disk storage. A removable or non-removable interface 1535 can be used to facilitate connection. These storage devices can be considered as part of the I/O device 1538 or at least they can be connected via the bus 1530. Storage devices that are "on board" generally include EEPROM used to store the BIOS.

The computer system 1501 further can include software to operate in the environment, such as an operating system 1511, system applications 1512, program modules 1513 and program data 1514, which are stored either in system memory 1532 or on disk storage 1536. Various operating systems or combinations of operating systems can be used.

Input devices can be used to enter commands or data, and can include a pointing device such as a mouse, stylus, touch pad, and other devices such as keyboard, microphone, connected through interface ports 1538. Interface ports 1538 can include connection ports, such as serial ports, parallel ports, or universal serial buses (USB). The interface ports 1538 can also accommodate output devices. For example, a USB port may be used to provide input to computer 1501 and to output information from computer 1501 to an output device. Output adapter 1539, such as video or sound cards, is provided to connect to some output devices such as monitors, speakers, and printers.

Computer 1501 can operate in a networked environment with remote computers. The remote computers, including a memory storage device, can be a data processing system, such as a personal computer, or a workstation, and typically includes many or all of the elements described relative to computer 1501. Remote computers can be connected to computer 1501 through a network interface 1535 and communication connection 1537, with wire or wireless connections. Network interface 1535 can be communication networks such as local-area networks (LAN), wide area networks (WAN) or wireless connection networks.

Figure 16:
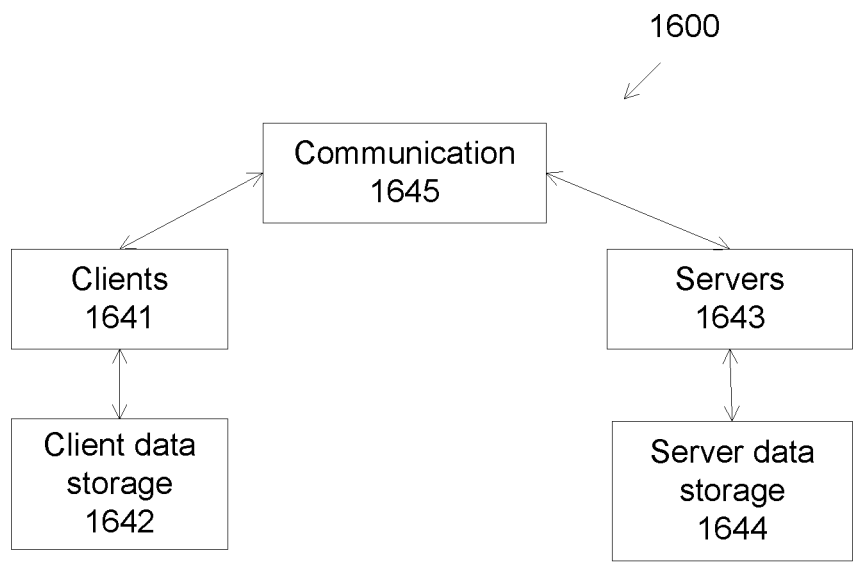
FIG. 16 is a schematic block diagram of a sample computing environment with which the present invention can interact.

FIG. 16 is a schematic block diagram of a sample computing environment with which the present invention can interact. The system 1600 includes a plurality of client systems 1641. The system 1600 also includes a plurality of servers 1643. The servers 1643 can be used to employ the present invention. The system 1600 includes a communication network 1645 to facilitate communications between the clients 1641 and the servers 1643. Client data storage 1642, connected to client system 1641, can store information locally. Similarly, the server 1643 can include server data storages 1644.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    searching databases of airlines to identify a plurality of flight itineraries, wherein the search uses Global Distribution System (GDS) protocols for airlines configured to participate in GDS network;
    obtaining monetary prices of the identified plurality of flight itineraries;
    obtaining, from databases of airlines offering the identified plurality of flight itineraries, characteristics, discounts, or bonuses of the identified flight itineraries, wherein the obtaining the characteristics, discounts, or bonuses uses New Distribution Capability (NDC) data transmission standards, Application Program Interface (API) protocols, or websites;
    converting the characteristics, discounts or bonuses to monetary values;
    obtaining values of the identified flight itineraries based on the monetary prices and the monetary values of the identified flight itineraries; and
    ranking the identified flight itineraries based on the values of the identified flight itineraries.

2. A method as in claim 1, wherein the characteristics of the identified flight itineraries comprise seat information, entertainment programs, food menu, and safety record.

3. A method as in claim 1, wherein the discounts or bonuses comprise promotional offerings of the airlines.

4. A method as in claim 1, wherein the conversion of the characteristics, discounts or bonuses is based on a look-up table.

5. A method as in claim 1, wherein different characteristics, discounts or bonuses of the characteristics, discounts or bonuses are converted to different monetary values based on a profile of a user requesting the flight itineraries.

6. A method as in claim 1, wherein the characteristics of the flight itineraries comprise seat information comprising at least one of seat size, seat width, seat pitch, seat position, or whether or not there is a power port at seat.

7. A method as in claim 1, wherein the characteristics of the flight itineraries comprise at least one of: Wi-Fi availability, airport lounge access, early check in, luggage information, additional luggage, upgradable services, or frequent flyer program availability.

8. A method as in claim 1, wherein the characteristics, discounts or bonuses are selected based on a profile of a user requesting the flight itineraries.

9. A method as in claim 8, wherein the profile is obtained based on actions of the user during previous flight booking.

10. A method as in claim 8, wherein
    the profile comprises ranking of preferences of the user, and
    the preference ranking is used to convert different characteristics, discounts, or bonuses to different monetary values.

11. A method as in claim 1, wherein the values of the identified flight itineraries are also monetary values.

12. A method as in claim 1, wherein the identified flight itineraries are ranked in order of decreasing values of the flight itineraries.

13. A method as in claim 1, wherein the identified flight itineraries are ranked based on the values of the flight itineraries for similar monetary prices of the identified flight itineraries.

14. A method as in claim 1, wherein the discounts or bonuses comprise at least one of: free Wi-Fi, free early check in, free additional luggage, free airport lounge access, or bonus frequent flyer points.

15. A method as in claim 1, further comprising:
    negotiating the discounts and bonuses with the airlines.

16. A method comprising:
    searching databases of airlines to identify flight itineraries, wherein the search uses Global Distribution System (GDS) protocols for airlines configured to participate in GDS network;
    obtaining monetary prices of the identified flight itineraries;
    obtaining, from databases of airlines offering the flight itineraries, characteristics of the identified flight itineraries, wherein the obtaining uses New Distribution Capability (NDC) data transmission standards, Application Program Interface (API) protocols, or websites;
    converting the characteristics to monetary values;
    obtaining values of the identified flight itineraries based on the monetary prices; and
    ranking the identified flight itineraries based on the values of the identified flight itineraries for similar monetary prices.

17. A method comprising:
    searching databases of airlines to identify flight itineraries, wherein the search uses Global Distribution System (GDS) protocols for airlines configured to participate in GDS network;
    obtaining monetary prices of the identified flight itineraries;
    obtaining, from databases of airlines offering the identified flight itineraries, available discounts or bonuses of the identified flight itineraries, wherein the obtaining process uses New Distribution Capability (NDC) data transmission standards, Application Program Interface (API) protocols, or websites;
    converting the discounts and bonuses to monetary values;
    obtaining values of the identified flight itineraries based on the monetary prices; and
    ranking the identified flight itineraries based on the values of the identified flight itineraries for similar monetary prices.

18. A method as in claim 1, wherein the values of the identified flight itineraries are calculated based on a difference between the monetary prices and the monetary values of the identified flight itineraries.

* * * * *